(12) United States Patent
Asano et al.

(10) Patent No.: US 7,179,197 B2
(45) Date of Patent: Feb. 20, 2007

(54) CLUTCH STATE DETERMINING DEVICE

(75) Inventors: Masahiro Asano, Kariya (JP); Eiji Takemoto, Obu (JP)

(73) Assignee: Denso Corporation, Kariya (JP)

( * ) Notice: Subject to any disclaimer, the term of this patent is extended or adjusted under 35 U.S.C. 154(b) by 250 days.

(21) Appl. No.: 11/008,738

(22) Filed: Dec. 10, 2004

(65) Prior Publication Data
US 2005/0130799 A1 Jun. 16, 2005

(30) Foreign Application Priority Data
Dec. 12, 2003 (JP) ............... 2003-415633
Oct. 7, 2004 (JP) ............... 2004-294455

(51) Int. Cl.
B60W 10/02 (2006.01)

(52) U.S. Cl. ............. 477/166; 477/77; 477/83; 477/177; 477/181; 701/67; 123/406.24; 123/436

(58) Field of Classification Search ............... 744/77, 744/83, 84; 477/166, 173, 175, 181; 192/30 W; 123/406.24, 436; 701/67; 73/116
See application file for complete search history.

(56) References Cited

U.S. PATENT DOCUMENTS 6,033,342 A * 3/2000 Steinel et al. ............ 477/181
6,040,768 A * 3/2000 Drexl ..................... 340/453
6,347,275 B1 * 2/2002 Nakano ................... 701/104
6,581,559 B1 * 6/2003 Grob et al. ............. 123/179.3
6,859,710 B2 * 2/2005 Genise ..................... 701/67
6,988,028 B2 * 1/2006 Iriyama .................... 701/93
2001/0034287 A1 * 10/2001 Nishimura et al. ......... 477/84
2002/0060114 A1 5/2002 Maruyama ............... 192/3.63

FOREIGN PATENT DOCUMENTS

EP 1 217 242 A2 6/2002
EP 1 382 876 A1 1/2004
JP 2002-266895 9/2002

* cited by examiner

Primary Examiner—David D. Le
(74) Attorney, Agent, or Firm—Nixon & Vanderhye P.C.

(57) ABSTRACT

If a user presses a clutch pedal to perform gear-shifting operation while a vehicle is traveling, a clutch disc, which has been engaged with a flywheel rotating with an engine, is brought to partial clutch engagement and slides on an end surface of the flywheel to generate friction. Thus, a first phenomenon in which a decreasing rate of the engine rotation speed rapidly increases occurs. Then, a second phenomenon in which the clutch disc is completely disengaged from the flywheel to eliminate the friction and the decreasing rate of the engine rotation speed returns to an original state occurs. If the first and second phenomena are detected successively when neither an engine side nor a power transmission system side transmits power for varying an engine rotation speed, it is determined that the clutch disc is disengaged.

23 Claims, 8 Drawing Sheets

| ... | $\omega_i$ | $\omega_{i+1}$ | $\omega_{i+2}$ | $\omega_{i+3}$ | $\omega_{i+4}$ | $\omega_{i+5}$ | $\omega_{i+6}$ | $\omega_{i+7}$ |
|---|---|---|---|---|---|---|---|---|
| ... | $\Delta\omega_i$ | $\Delta\omega_{i+1}$ | $\Delta\omega_{i+2}$ | $\Delta\omega_{i+3}$ | $\Delta\omega_{i+4}$ | $\Delta\omega_{i+5}$ | $\Delta\omega_{i+6}$ | $\Delta\omega_{i+7}$ |

CLUTCH STATE DETERMINING DEVICE

CROSS REFERENCE TO RELATED APPLICATION

This application is based on and incorporates herein by reference Japanese Patent Applications No. 2003-415633 filed on Dec. 12, 2003 and No. 2004-294455 filed on Oct. 7, 2004.

BACKGROUND OF THE INVENTION

1. Field of the Invention

The present invention relates to a clutch state determining device for determining engagement or disengagement of a clutch, based on an engine rotation signal outputted by a rotation speed sensor, without using a shift operation switch such as a clutch switch or a neutral switch.

2. Description of Related Art

Usually, if gear-shifting operation is performed while a vehicle having a manual gearshift (a manual transmission) is traveling, an accelerator, which has been pressed, is released first, and then, a clutch pedal is pressed. A clutch switch is disposed near the clutch pedal for determining whether the clutch pedal is pressed to a predetermined position. For instance, the predetermined position is a position where the clutch pedal is pressed lightly. An engine control unit (ECU) determines that the clutch is in a disengaged state if an ON-signal is inputted from the clutch switch, and determines that the clutch is in an engaged state if an OFF-signal is inputted from the clutch switch. Then, the ECU outputs a control signal to the engine for performing a predetermined control. This technology is disclosed in Unexamined Japanese Patent Application Publication No. 2002-188658 (pages 1 to 12 and FIGS. 1 to 7) or No. 2002-266895 (pages 1 to 8 and FIGS. 1 to 3), for instance.

However, in the case where the engagement or the disengagement of the clutch is determined by using the clutch switch as in the above technology, the cost is increased because the switch equipment is used and the number of man-hours is increased because fine adjustment is necessary after the clutch switch is mounted. Moreover, detection accuracy is deteriorated by a change with time of the clutch. In the above technology, the clutch switch is set to determine that the clutch is disengaged even if the clutch pedal is pressed only slightly or by a play, or even if the clutch is brought to partial clutch engagement, for instance. Thus, determination accuracy of the engagement or the disengagement of the clutch is low.

SUMMARY OF THE INVENTION

It is therefore an object of the present invention to provide a clutch state determining device capable of determining engagement or disengagement of a clutch in gear-shifting operation highly accurately without using a clutch switch while a vehicle is traveling. A characteristic variation in an engine rotation speed occurs when a clutch is engaged or disengaged. Therefore, the clutch state determining device can determine the engagement or disengagement of the clutch by using instantaneous rotation speeds provided by respective cylinders of the engine, which are sensed by rotation speed sensing means.

According to an aspect of the present invention, a clutch state determining device for determining engagement or disengagement of a clutch includes sensing means, prohibiting means and determining means. The sensing means senses a rotation speed of a driving part. If the prohibiting means determines that neither the driving part nor a driven part transmits power for varying the rotation speed of the driving part, the determining means determines whether or not the clutch is in a disengaged state based on a variation in the rotation speed of the driving part sensed by the sensing means. Thus, erroneous determination can be prevented or reduced. For instance, erroneous determination of erroneously determining that the clutch is in the disengaged state even though the clutch is in the engaged state can be prevented.

An internal combustion engine such as a multi-cylinder diesel engine mounted in a vehicle is employed as the driving part. A power transmission system for transmitting rotating power of the engine to wheels is employed as the driven part. The power transmission system includes a transmission, a drive shaft, a final reduction gear unit, an axle, and driving wheels (rear wheels), but does not include a clutch mechanism. A rotation speed sensor for sensing instantaneous rotation speeds corresponding to the respective cylinders of the engine is employed as the sensing means.

The determining means is started when the prohibiting means determines that neither the driving part nor the driven part transmits the power for varying the rotation speed of the driving part, or when the prohibiting means determines that neither the engine nor the power transmission system transmits the power for varying the rotation speed of the engine.

According to another aspect of the present invention, the determining means determines that the clutch is disengaged if the determining means detects a phenomenon in which a decreasing rate of the instantaneous rotation speed corresponding to at least one first specific cylinder out of the entire cylinders of the engine becomes greater than a first determination value, and if the determining means successively detects another phenomenon in which the decreasing rate of the instantaneous rotation speed corresponding to at least one second specific cylinder out of the entire cylinders of the engine becomes less than a second determination value. Thus, without using the clutch switch, the disengagement of the clutch due to the gear-shifting operation performed while the vehicle is traveling can be determined more accurately by using the instantaneous rotation speeds corresponding to the respective cylinders of the engine, which are sensed by the rotation speed sensor. The first specific cylinder and the second specific cylinder may be the same, or may be different from each other.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF THE REFERRED EMBODIMENTS (First Embodiment)

Figure 1:
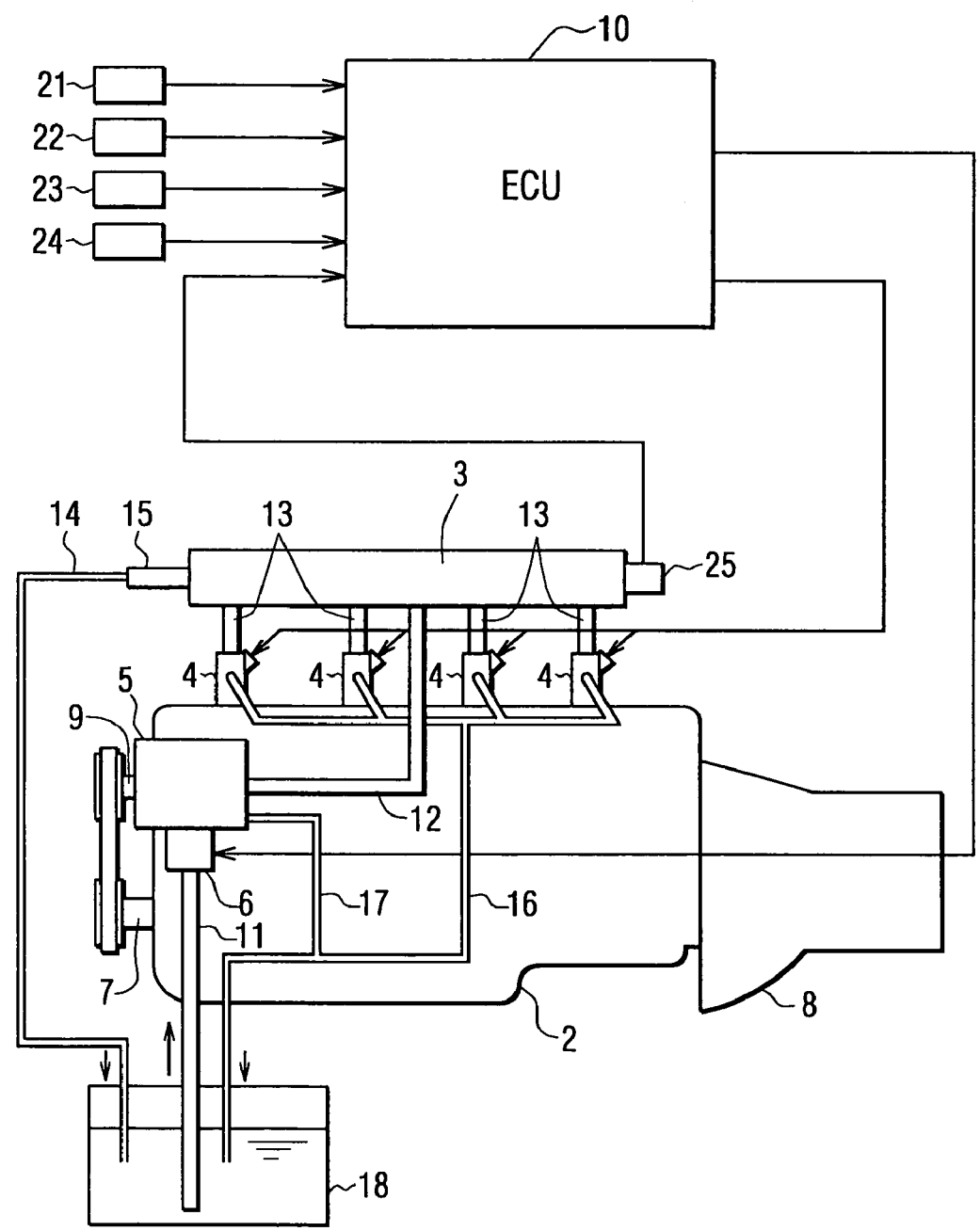
FIG. 1 is a schematic diagram showing a common rail type fuel injection system of an engine according to a first embodiment of the present invention.

Referring to FIG. 1, a common rail type fuel injection system of an internal combustion engine according to a first embodiment of the present invention is illustrated.

The fuel injection system of the first embodiment is mounted in a heavy-duty vehicle 1 such as a vehicle equipped with a diesel engine. More specifically, the fuel injection system of the first embodiment is a common rail type fuel injection system (an accumulation type fuel injection system) known as a fuel injection system mainly used in an internal combustion engine 2 such as a multi-cylinder diesel engine. The fuel injection system accumulates high-pressure fuel in a common rail 3 and injects the accumulated high-pressure fuel into combustion chambers of respective cylinders of the engine 2 through multiple fuel injection valves (injectors) 4 mounted to the respective cylinders. The fuel injection system includes the common rail 3, the multiple (four, in the present embodiment) injectors 4, a suction quantity control type fuel supply pump 5 and an engine control unit (ECU) 10. The common rail 3 accumulates the fuel at a high pressure corresponding to a fuel injection pressure. The injector 4 injects the fuel into the combustion chamber of each cylinder of the engine 2 at predetermined injection timing. The supply pump 5 pressurizes the fuel, which is drawn into pressurizing chambers through a suction control valve (SCV) 6, to a high pressure. The ECU 10 electronically controls electromagnetic valves of the injectors 4 and the SCV 6 of the supply pump 5.

An output shaft (for instance, a crankshaft) 7 of the engine 2 is connected to an input shaft of a multiple-speed gearbox through a clutch mechanism. The multiple-speed gearbox as a power transmission device transmits rotating power of the crankshaft 7 of the engine 2 to respective wheels (driving wheels). In the present embodiment, a manual gearbox (a manual transmission) 8 is employed as the multiple-speed gearbox. The manual transmission 8 provides multiple speeds for forward travel. The manual transmission 8 changes the rotation speed of the engine 2 at predetermined change gear ratios. Effects such as improvement of power performance, fuel consumption and quietness can be achieved by employing a gearbox providing five speeds for forward travel and one speed for backward travel as the multiple-speed gearbox. The clutch mechanism for performing transmission and interruption of the power between the engine 2 and the driving wheels is disposed just behind the engine 2. If a vehicle driver presses a clutch pedal, the clutch mechanism interrupts the rotating power of the engine 2. If the vehicle driver releases the clutch pedal, the clutch mechanism transmits the rotating power.

A clutch disc is accommodated inside a clutch cover, which is attached to a flywheel, and is connected to the transmission 8 through the input shaft. The flywheel rotates in synchronization with the crankshaft 7 of the engine 2. The clutch disc is pressed against the rotating flywheel by a pressure plate and a spring to cause friction between the clutch disc and the flywheel. Thus, the rotating power of the engine 2 is transmitted to the transmission 8 with the use of the friction. The rotating power of the engine 2 can be transmitted gradually by regulating the pressing degree of the clutch pedal so that the clutch disc slides on an end surface of the flywheel with the use of the friction caused therebetween. An engagement-disengagement state of the clutch disc, or a clutch state, can be divided into a disengaged state, partial clutch engagement, and an engaged state. The disengaged state is provided by pressing the clutch pedal to completely disengage the clutch disc from the flywheel. The partial clutch engagement is provided when a foot of the vehicle driver is put on the clutch pedal to keep partly engaging the clutch disc with the flywheel by using partial pressing power. If the vehicle driver releases the clutch pedal, the engaged state is provided and the clutch disc is engaged with the flywheel.

The common rail 3 accumulates the high-pressure fuel, which is pressure-fed from the supply pump 5, in an accumulation vessel. The high-pressure fuel accumulated in the common rail 3 is supplied to the multiple injectors 4 through multiple branching passages. The common rail 3 is required to continuously accumulate the fuel at the high pressure corresponding to the fuel injection pressure. Therefore, the common rail 3 is connected with a discharge port of the supply pump 5 through a fuel supply pipe 12. A pressure limiter 15 is attached to a relief pipe (a fuel return passage) 14 leading from the common rail 3 to a fuel tank 18. The pressure limiter 15 is a pressure safety valve, which opens to limit the fuel pressure in the common rail below a limit set pressure if the fuel pressure in the common rail 3 exceeds the limit set pressure.

The injectors 4 mounted to the respective cylinders of the engine are electromagnetic fuel injection valves respectively connected to downstream ends of fuel supply pipes (branching pipes) 13 branching from the common rail 3. Each injector 4 includes a fuel injection nozzle, an electromagnetic valve, and needle biasing means such as a spring. The fuel injection nozzle performs the fuel injection into the combustion chamber of each cylinder of the engine 2. The electromagnetic valve drives a nozzle needle accommodated in the fuel injection nozzle in a valve opening direction. The needle biasing means biases the nozzle needle in a valve closing direction. The fuel injection from the injector 4 into the combustion chamber of each cylinder of the engine 2 is electronically controlled by energization and de-energization of the electromagnetic valve, which regulates a fuel pressure in a back pressure control chamber. The back pressure control chamber controls operation of a command piston, which moves with the nozzle needle. More specifically, while the electromagnetic valve of the injector 4 is energized and the nozzle needle opens an injection hole, the high-pressure fuel accumulated in the common rail 3 is injected into the combustion chamber of each cylinder of the engine 2. Thus, the engine 2 is operated. The injector 4 is formed with a leak port, through which surplus fuel or fuel discharged from the back pressure control chamber overflows to a low-pressure side of a fuel system. The leak fuel leaking from the injectors 4 is returned to the fuel tank 18 through a fuel return pipe 16.

The supply pump 5 is a high-pressure supply pump including two pressure-feeding systems (pump elements) for pressurizing the drawn low-pressure fuel to a high pressure and for pressure-feeding the pressurized fuel into the common rail 3. The supply pump 5 controls an entire discharge quantity of the fuel discharged from the pressure-feeding systems by regulating the quantity of the drawn fuel with the use of the single SCV 6. The supply pump 5 includes a feed pump (a low-pressure feed pump), a cam and multiple (two, in the present embodiment) plungers #1, #2. The feed pump draws the low-pressure fuel from the fuel tank 18 if a pump drive shaft (a drive shaft or a camshaft) 9 rotates in accordance with the rotation of the crankshaft 7 of the engine 2. The cam is rotated by the pump drive shaft 9. Each one of the plungers #1, #2 is driven by the cam to reciprocate between a top dead center and a bottom dead center. Multiple (two, in the present embodiment) discharge valves are disposed in fuel discharge passages for discharging the high-pressure fuel toward the common rail 3 from the pressurizing chambers. The discharge valve opens if the fuel pressure in the pressurizing chamber exceeds a predetermined value.

Figure 2:
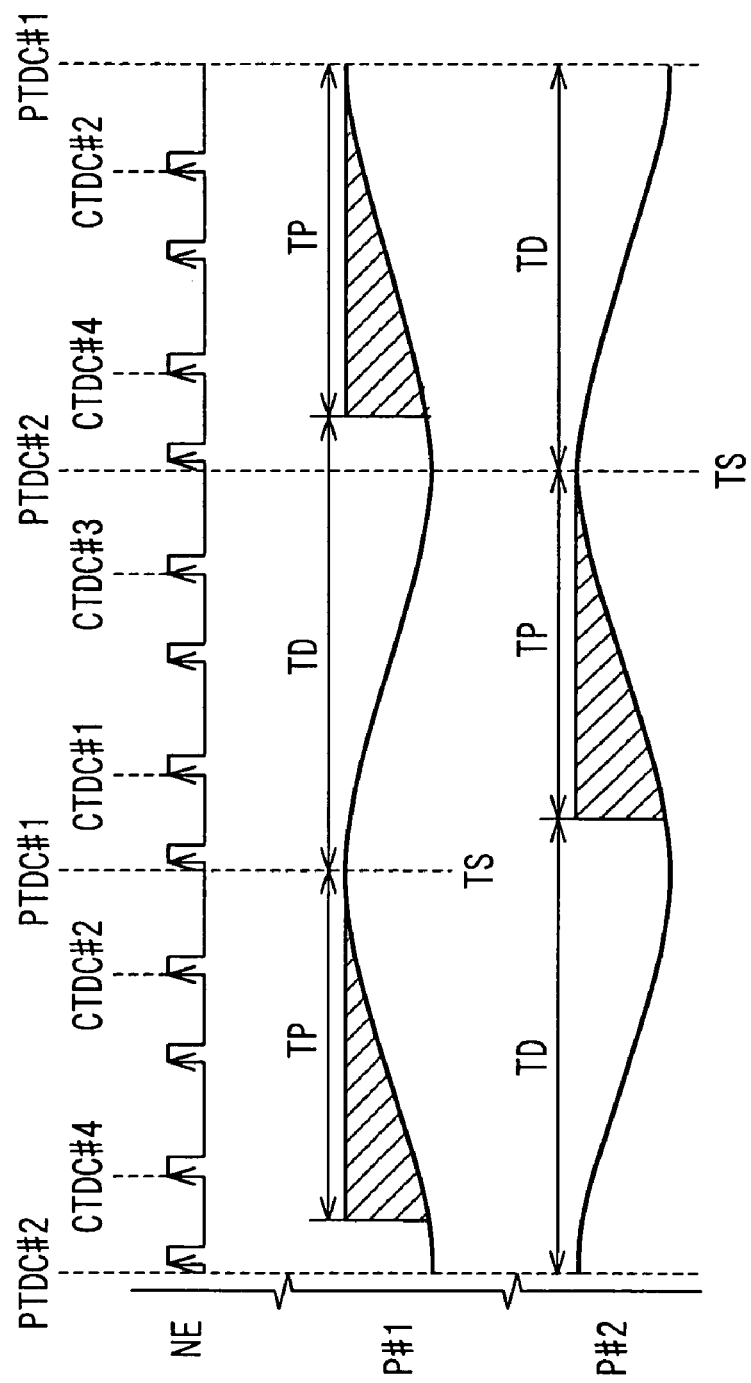
FIG. 2 is a time chart showing a rotation signal pulse and transitions of positions of first and second plungers of a supply pump of the fuel injection system according to the first embodiment.

The plungers #1, #2 of the supply pump 5 reciprocate inside pump cylinders to pressurize the low-pressure fuel, which is drawn from the fuel tank 18 into the multiple (two, in the present embodiment) pressurizing chambers (plunger chambers) through a fuel feed pipe 11, to a high pressure. A fuel filter is disposed in the fuel feed pipe 11. The supply pump 5 draws the low-pressure fuel into the pressurizing chamber in a pump drawing period TD shown in FIG. 2 from a time point TS when each one of the plungers P#1, P#2 is positioned at each one of top dead centers PTDC#1, PTDC#2 to a time point when each one of the plungers P#1, P#2 passes by each one of bottom dead centers. Then, the supply pump 5 pressure-feeds the high-pressure fuel pressurized in the pressurizing chamber while the discharge valve is open, or in a pump pressure-feeding period TP shown in FIG. 2 from the end of the pump drawing period TD to a time point when each one of the plungers P#1, P#2 returns to each one of the top dead centers PTDC#1, PTDC#2. The supply pump 5 is formed with a leak port for preventing an excessive increase in temperature of the fuel inside the supply pump 5. The leak fuel leaking from the supply pump 5 is returned to the fuel tank 18 through a fuel return pipe 17. The time chart shown in FIG. 2 indicates operation of the fuel injection system performing two injections (into the two cylinders) while the fuel is pressure-fed once. In FIG. 2, a sign P#1 indicates a lifting distance of the first plunger #1, and a sign P#2 indicates a lifting distance of the second plunger #2.

The SCV 6 is disposed in a fuel suction passage, which is formed in the supply pump 5 and leads from the feed pump to the pressurizing chambers. The SCV 6 regulates an opening degree of the fuel suction passage (a lifting distance of a valve member or an opening degree of a valve hole). The ECU 10 electronically controls the SCV 6 with a pump-driving current (a pump-driving signal), which is supplied by the ECU 10 to the SCV 6 through a pump drive circuit, so that the SCV 6 regulates a suction quantity (a pump suction quantity) of the fuel drawn into the pressurizing chambers of the supply pump 5. Thus, a discharge quantity (a pump discharge quantity or a pump pressure-feeding quantity) of the fuel discharged from the pressurizing chambers of the supply pump 5 into the common rail 3 is controlled. The SCV 6 includes the valve member, a solenoid coil, and valve member biasing means such as a spring. The valve member changes the opening degree of the fuel suction passage in accordance with the lifting distance of the valve member. The solenoid coil drives the valve member in a valve closing direction (or in a valve opening direction). The biasing means biases the valve member in a valve opening direction (or in a valve closing direction). The SCV 6 regulates the discharge quantity of the fuel discharged from the pressurizing chambers of the supply pump 5 into the common rail 3 in proportion to the pump-driving current supplied to the solenoid coil. Thus, the SCV 6 changes the fuel pressure in the common rail 3 (a common rail pressure) corresponding to the injection pressure of the fuel injected from the injectors 4 into the combustion chambers of the respective cylinders of the engine 2.

The ECU 10 of the present embodiment includes a microcomputer having publicly known structure, an injector drive circuit (EDU), and the pump drive circuit. The microcomputer has functions of CPU for performing control processing and calculation processing, a memory device (a memory such as ROM, EEPROM, RAM or standby RAM) for storing various types of programs and control data, an input circuit, an output circuit, a power source circuit and the like. The pump drive circuit supplies the pump-driving current to the solenoid coil of the SCV 6. The EDU is injector driving means for individually supplying a pulse-shaped injector driving current to the electromagnetic valve of the injector 4 of each cylinder. If an ignition switch is turned on (IG-ON), the ECU 10 is supplied with power (ECU power) and electronically controls a fuel injection quantity or the fuel injection pressure (the common rail pressure) to a control value, based on the control programs stored in the memory. If the ignition switch is turned off (IG-OFF) and the supply of the ECU power is stopped, the above control based on the control programs stored in the memory is compulsorily ended.

An output value (a common rail pressure signal) outputted from a fuel pressure sensor 25, which is mounted to the common rail 3, sensor signals outputted from various other sensors, and switch signals outputted from certain switches disposed in the vehicle are converted from analog signals into digital signals by an A/D converter, and then, are inputted into the input circuit of the microcomputer housed in the ECU 10. A crank angle sensor 21, an accelerator position sensor 22, a cooling water temperature sensor 23, a fuel temperature sensor as operating state sensing means for sensing operating states or operating conditions of the engine 2 are connected to the input circuit of the microcomputer. The crank angle sensor 21 senses a rotational angle of the crankshaft 7 of the engine 2. The accelerator position sensor 22 senses an accelerator operation amount (an accelerator position ACCP) corresponding to a pressed degree of an accelerator. The cooling water temperature sensor 23 senses engine cooling water temperature THW. The fuel temperature sensor senses temperature THF of pump suction side fuel, which is drawn into the supply pump 5.

The crank angle sensor 21 is a rotation speed sensor including an electromagnetic pickup coil facing an outer peripheral surface of a timing rotor, which is attached to the crankshaft 7 of the engine 2 or the pump drive shaft 9 of the supply pump 5. Protruding teeth are formed on the outer peripheral surface of the timing rotor at a predetermined interval of the rotational angle. In the present embodiment, four protruding teeth are disposed at a predetermined interval of the rotational angle of 180° (the crank angle of 180°: 180° C.A) for determining reference positions of the respective cylinders #1, #2, #3, #4 corresponding to top dead centers CTDC#1, CTDC#2, CTDC#3, CTDC#4 (shown in FIG. 2) of the respective cylinders #1, #2, #3, #4.

In addition, another two protruding teeth are disposed on the outer peripheral surface of the timing rotor at a predetermined interval of the crank angle of 360° (360° C.A) for determining suction start timing TS of the supply pump 5. The suction start timing TS of the supply pump 5 corresponds to the top dead center PTDC#1 of the plunger #1 and the top dead center PTDC#2 of the plunger #2. The respective protruding teeth of the timing rotor repeatedly approach to and recede from the crank angle sensor 21. Thus, the crank angle sensor 21 outputs pulse-shaped rotational position signals (rotation signal pulses NE) synchronized with the rotation speed of the supply pump 5 (pump rotation speed) by electromagnetic induction as shown by protrusions of a solid line NE in FIG. 2. The ECU 10 functions as engine rotation speed sensing means for sensing an engine rotation speed ω by measuring time intervals among the rotation signal pulses NE outputted from the crank angle sensor 21. The accelerator position sensor 22 outputs an accelerator position signal corresponding to the accelerator position ACCP.

Vehicle information can be also inputted to the input circuit of the microcomputer as shown in FIG. 1. For instance, a vehicle speed sensor 24, a brake switch 26, and an air conditioner switch are connected to the input circuit of the microcomputer. The vehicle speed sensor 24 senses a traveling speed of the vehicle. The brake switch 26 senses a manipulated state of a brake pedal. The air conditioner switch senses an operating state of an air conditioner, which conditions the air inside a vehicular compartment, or an air conditioner load Lac as one of external loads of engine accessories. The vehicle speed sensor 24 is a reed switch vehicle speed sensor or a magneto-resistive element vehicle speed sensor, for instance. The vehicle speed sensor 24 measures a rotation speed of an output shaft of the transmission 8 and outputs a vehicle speed signal corresponding to the traveling speed of the vehicle. Alternatively, a vehicle speed sensor for measuring a rotation speed of the vehicular wheel may be employed as the vehicle speed sensing means. The brake switch 26 outputs a brake-ON signal and turns on a brake lamp when a vehicle driver (a user) presses the brake pedal. If the user releases the brake pedal, the brake switch 26 outputs a brake-OFF signal and turns off the brake lamp. The air conditioner switch commands start and stop of operation of the air conditioner by turning on and turning off an electromagnetic clutch, which provides or interrupts transmission of the power from the crankshaft 7 of the engine 2 to a compressor for the air conditioner.

The ECU 10 includes fuel pressure controlling means (common rail pressure controlling means) for calculating the optimum common rail pressure corresponding to the operating state of the engine 2 and for driving the solenoid coil of the SCV 6 through the pump drive circuit. The fuel pressure controlling means includes fuel pressure determining means for calculating a target common rail pressure (a target fuel pressure) PFIN based on the engine rotation speed and a basic injection quantity Q or a command injection quantity QFIN. In order to achieve the target fuel pressure PFIN, the fuel pressure controlling means feedback-controls the fuel discharge quantity of the supply pump 5 by regulating the pump-driving current supplied to the solenoid coil of the SCV 6. More specifically, the fuel pressure controlling means feedback-controls the fuel discharge quantity of the supply pump 5 by PI control (proportional-plus-integral control) or by PID control (proportional-plus-integral-plus-derivative control) so that the common rail pressure PC sensed by the fuel pressure sensor 25 substantially coincides with the target fuel pressure PFIN. More specifically, the fuel pressure controlling means feedback-controls the pump-driving current (supplied to the solenoid coil of the SCV 6), which is correlated with the fuel discharge quantity of the supply pump 5, in accordance with a pressure deviation ΔP between the common rail pressure PC sensed by the fuel pressure sensor 25 and the target fuel pressure PFIN.

Next, a method of determining engagement or disengagement of the clutch disc, or the clutch state, will be explained based on FIGS. 1 to 5. A method of detecting the disengagement of the clutch disc without using a shift operation switch such as a clutch switch or a neutral position switch is shown by control logic of FIG. 3.

Figure 3:
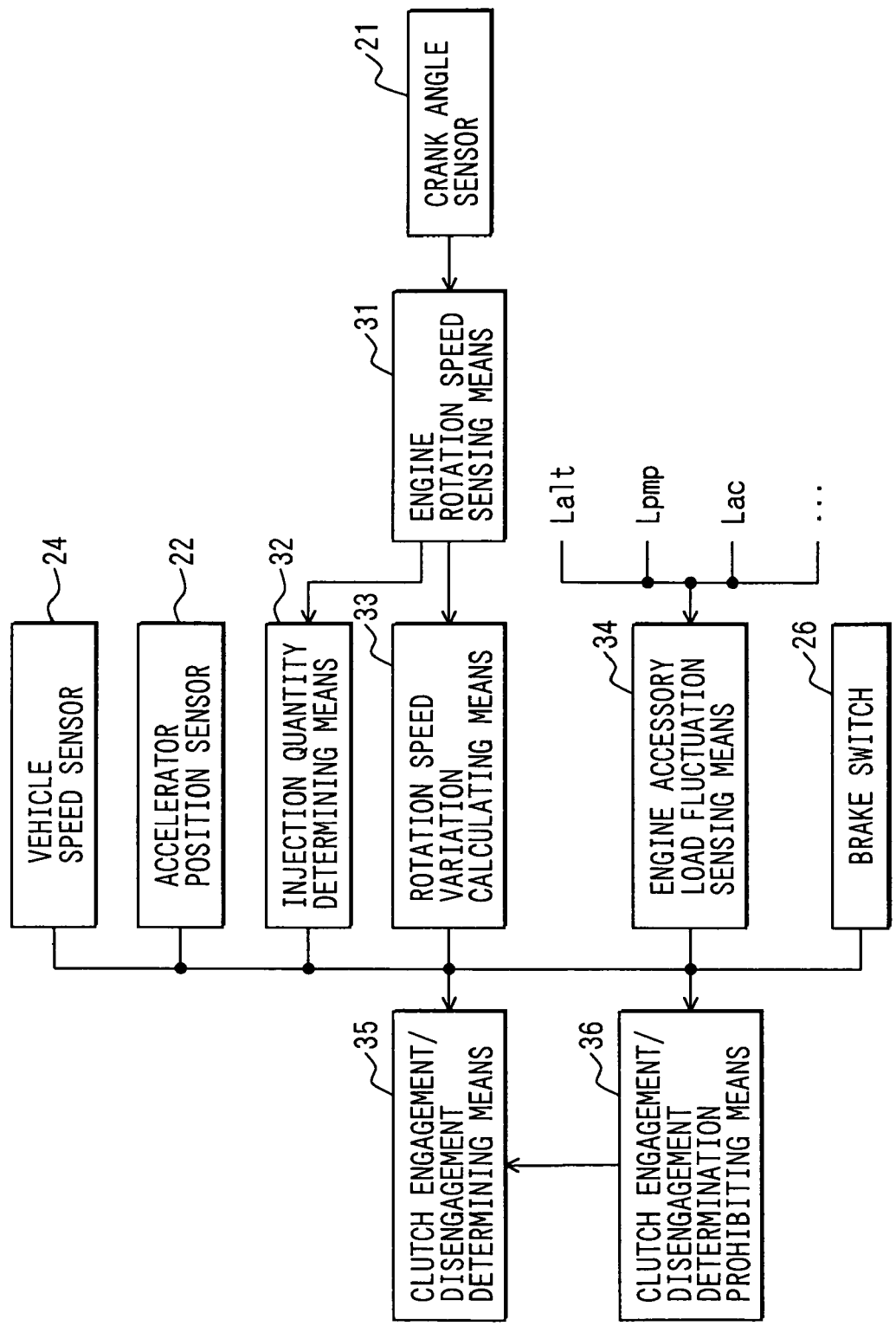
FIG. 3 is a diagram showing control logic executed by an engine control unit of the fuel injection system according to the first embodiment.

As shown in the control logic of FIG. 3, the ECU 10 includes engine rotation speed sensing means 31 for calculating instantaneous rotation speed of the engine 2 (the engine rotation speed ω) provided by each cylinder, by measuring the time intervals among the rotation signal pulses NE inputted from the crank angle sensor 21. The engine rotation speed sensing means 31 takes in an average of the time intervals among the rotation signal pulses NE, which are inputted during a predetermined crank angle period, as an average instantaneous rotation speed (a sensing period average rotation speed) of a specific injection cylinder (a cylinder for performing the injection). The predetermined crank angle period is a crank angle range from BTDC90° C.A (90° C.A before the top dead center) to ATDC90° C.A (90° C.A after the top dead center) of the specific cylinder.

The ECU 10 includes injection quantity determining means 32 for calculating the command injection quantity QFIN by adding an injection quantity correction value to the basic injection quantity Q. The basic injection quantity Q is set in accordance with the engine rotation speed ω calculated by the engine rotation speed sensing means 31 and the accelerator position ACCP sensed by the accelerator position sensor 22. The correction value is calculated in accordance with the engine cooling water temperature THW and the fuel temperature THF. The command injection quantity QFIN is calculated individually for each cylinder of the engine 2. The ECU 10 includes injection timing determining means for calculating command injection timing TFIN for each cylinder of the engine 2 in accordance with the command injection quantity QFIN and the engine rotation speed ω. The ECU 10 includes injection period determining means for calculating an energization period (a command injection period TQ) of the electromagnetic valve of the injector 4 in accordance with the command injection quantity QFIN and the common rail pressure PC sensed by the fuel pressure sensing means such as the fuel pressure sensor 25. The command injection timing TFIN of each cylinder of the engine 2 is set near the top dead center of the cylinder (each one of the top dead centers CTDC#1, CTDC#2, CTDC#3, CTDC#4) as shown by the protrusions of the solid line NE in FIG. 2.

The ECU 10 includes rotation speed variation calculating means 33 for calculating an engine rotation speed variation Δω (an engine rotation speed variation corresponding to 720° C.A) based on a variation between the engine rotation speed at the present crank angle and the engine rotation speed at the crank angle prior to the present crank angle by 720° C.A. For instance, as shown in a time chart of FIG. 4A, the rotation speed variation calculating means 33 reads the engine rotation speed ω at a start of a predetermined sampling interval (720° C.A, in the present embodiment) of the first cylinder #1 as a previous value $\omega i(\#1)$ of the first cylinder #1 and the engine rotation speed $\omega$ at an end of the sampling interval as a present value $\omega i+4(\#1)$ of the first cylinder #1. Then, the rotation speed variation calculating means 33 calculates an engine rotation speed variation $\Delta\omega i+4$ of the first cylinder #1 based on a variation between the previous value $\omega i(\#1)$ and the present value $\omega i+4(\#1)$ of the first cylinder #1. Likewise, the rotation speed variation calculating means 33 reads the engine rotation speed $\omega$ at a start of a predetermined sampling interval (720° C.A, in the present embodiment) of the third cylinder #3 as a previous value $\omega i+1(\#3)$ of the third cylinder #3 and the engine rotation speed $\omega$ at an end of the sampling interval as a present value $\omega i+5(\#3)$ of the third cylinder #3. Then, the rotation speed variation calculating means 33 calculates an engine rotation speed variation $\Delta\omega i+5$ of the third cylinder #3 based on a variation between the previous value $\omega i+1(\#3)$ and the present value $\omega i+5(\#3)$ of the third cylinder #3.

Likewise, the rotation speed variation calculating means 33 reads the engine rotation speed $\omega$ at a start of a predetermined sampling interval (720° C.A, in the present embodiment) of the fourth cylinder #4 as a previous value $\omega i+2(\#4)$ of the fourth cylinder #4 and the engine rotation speed $\omega$ at an end of the sampling interval as a present value $\omega i+6(\#4)$ of the fourth cylinder #4. Then, the rotation speed variation calculating means 33 calculates an engine rotation speed variation $\Delta\omega i+6$ of the fourth cylinder #4 based on a variation between the previous value $\omega i+2(\#4)$ and the present value $\omega i+6(\#4)$ of the fourth cylinder #4. Likewise, the rotation speed variation calculating means 33 reads the engine rotation speed $\omega$ at a start of a predetermined sampling interval (720° C.A, in the present embodiment) of the second cylinder #2 as a previous value $\omega i+3(\#2)$ of the second cylinder #2 and the engine rotation speed $\omega$ at an end of the sampling interval as a present value $\omega i+7(\#2)$ of the second cylinder #2. Then, the rotation speed variation calculating means 33 calculates an engine rotation speed variation $\Delta\omega i+7$ of the second cylinder #2 based on a variation between the previous value $\omega i+3(\#2)$ and the present value $\omega i+7(\#2)$ of the second cylinder #2.

Figures 4A, 4B:
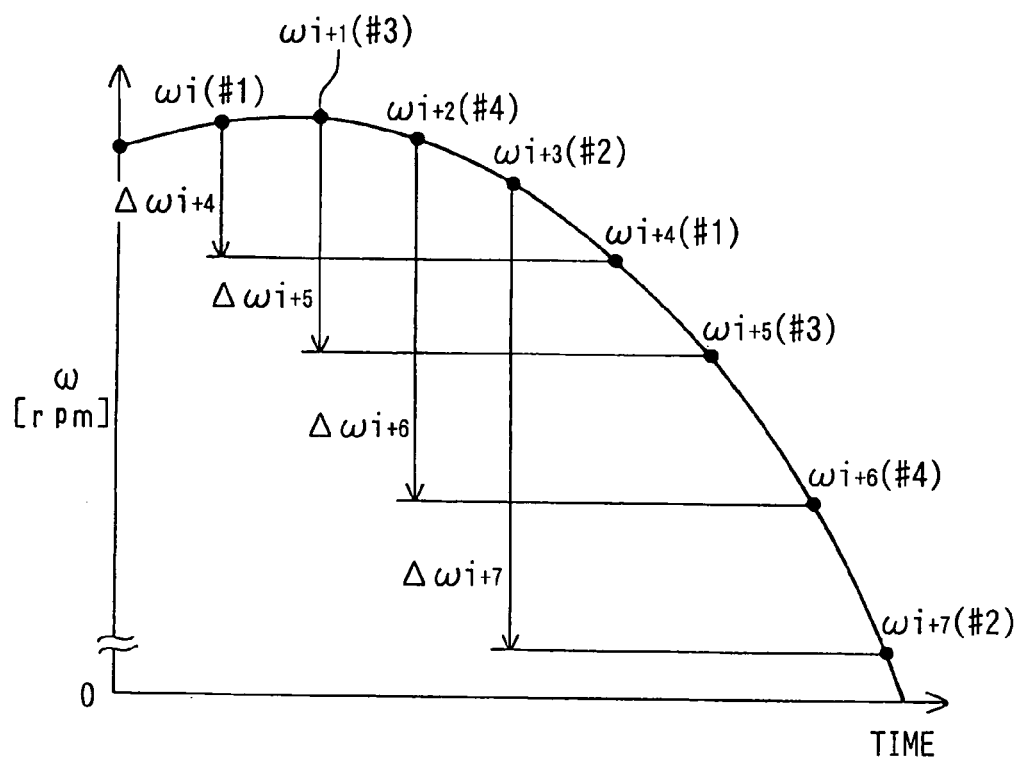
FIG. 4A is a graph showing a method of calculating a variation in a rotation speed of the engine according to the first embodiment.
FIG. 4B is a table showing values of the rotation speed and the variation in the rotation speed of the engine according to the first embodiment.

The timing chart of FIG. 4A shows a method of calculating the engine rotation speed variations $\Delta\omega$ of the respective cylinders of the four-cylinder engine 2. The four-cylinder engine 2 of the present embodiment sequentially performs the fuel injections in the first cylinder #1, in the third cylinder #3, in the fourth cylinder #4 and in the second cylinder #2, in that order. The engine rotation speed $\omega$ is sensed every time the injection cylinder is switched. More specifically, the engine rotation speed $\omega$ is sensed once while the crankshaft 7 makes a half turn in the case of the four-cylinder engine 2. Each one of the values $\omega i$, $\omega i+1$, $\omega i+2$, $\omega i+3$, $\omega i+4$, $\omega i+5$, $\omega i+6$, $\omega i+7$, etc. of the engine rotation speed $\omega$ is obtained in that order as shown in FIG. 4A every time the injection cylinder is switched among the first cylinder #1, the third cylinder #3, the fourth cylinder #4, and the second cylinder #2 in that order. The engine rotation speed variation $\Delta\omega$ is calculated by subtracting the previous value of the engine rotation speed $\omega$ of a certain cylinder from the present value of the engine rotation speed $\omega$ of the certain cylinder. The values $\Delta\omega i$, $\Delta\omega i+1$, $\Delta\omega i+2$, $\Delta\omega i+3$, $\Delta\omega i+4$, $\Delta\omega i+5$, $\Delta\omega i+6$, $\Delta\omega i+7$, etc. of the engine rotation speed variation $\Delta\omega$ are obtained in that order.

The ECU 10 includes engine accessory load fluctuation sensing means 34 for sensing fluctuations of the external loads of the engine accessories such as an alternator load Lalt of an alternator, which is driven to rotate by the crankshaft 7 of the engine 2, or a pump load Lpmp of the supply pump 5, or a fluctuation of another external load such as the air conditioner load Lac of the air conditioner. The ECU 10 includes clutch engagement/disengagement determination prohibiting means (erroneous determination preventing means) 36. The clutch engagement/disengagement determination prohibiting means 36 suspends or prohibits the determination of the engagement or the disengagement of the clutch disc if power for varying the engine rotation speed $\omega$ corresponding to the rotation speed of a driving part (the engine 2) is transmitted from the driving part or a driven part (a power transmission system, which includes the transmission 8, a drive shaft, a final reduction gear unit, an axle and the driving wheels, other than the clutch mechanism). Thus, erroneous determination of the disengagement of the clutch disc can be prevented.

A slope resistance generated when the vehicle travels on an upward slope can be employed as the power, which is transmitted from the power transmission system side and varies the engine rotation speed $\omega$, or as a factor defining a condition under which the clutch engagement/disengagement determination prohibiting means 36 suspends or prohibits the determination of the engagement or the disengagement of the clutch disc. Therefore, the clutch engagement/disengagement determination prohibiting means 36 outputs a determination-suspending signal or a determination-prohibiting signal to clutch engagement/disengagement determining means 35 to suspend or prohibit the determination of the engagement or the disengagement of the clutch disc when the vehicle is traveling on the upward slope and is being decelerated.

Another slope resistance generated when the vehicle travels on a downward slope can be employed as the power, which is transmitted from the power transmission system side and varies the engine rotation speed $\omega$, or as a factor defining a condition under which the clutch engagement/disengagement determination prohibiting means 36 suspends or prohibits the determination of the engagement or the disengagement of the clutch disc. Therefore, the clutch engagement/disengagement determination prohibiting means 36 outputs the determination-suspending signal or the determination-prohibiting signal to the clutch engagement/disengagement determining means 35 to suspend or prohibit the determination of the engagement or the disengagement of the clutch disc when the vehicle is traveling on the downward slope and is being accelerated.

The injection quantity of the fuel supplied into the combustion chamber of each cylinder of the engine 2 for generating engine output shaft torque can be employed as a factor related to the power, which is transmitted from the engine 2 side and varies the engine rotation speed $\omega$, or as a factor defining a condition under which the clutch engagement/disengagement determination prohibiting means 36 suspends or prohibits the determination of the engagement or the disengagement of the clutch disc. Therefore, the clutch engagement/disengagement determination prohibiting means 36 outputs the determination-suspending signal or the determination-prohibiting signal to the clutch engagement/disengagement determining means 35 to suspend or prohibit the determination of the engagement or the disengagement of the clutch disc if the command injection quantity QFIN or the command injection period TQ increases by at least a predetermined value.

The fluctuation of the external load of the engine accessory driven by the crankshaft 7 of the engine 2 can be employed as the power, which is transmitted from the engine 2 side and varies the engine rotation speed $\omega$, or as the factor defining the condition under which the clutch engagement/ disengagement determination prohibiting means 36 suspends or prohibits the determination of the engagement or the disengagement of the clutch disc. Therefore, the clutch engagement/disengagement determination prohibiting means 36 outputs the determination-suspending signal or the determination-prohibiting signal to the clutch engagement/disengagement determining means 35 to suspend or prohibit the determination of the engagement or the disengagement of the clutch disc if the external load of the engine accessory fluctuates by at least a predetermined value, or if the fluctuation of the load sensed by the engine accessory load fluctuation sensing means 34 becomes equal to or greater than the predetermined value.

The braking force generated if the vehicle is braked while the vehicle is traveling can be employed as the power, which is transmitted from the power transmission system side and varies the engine rotation speed $\omega$, or as a factor defining the condition under which the clutch engagement/disengagement determination prohibiting means 36 suspends or prohibits the determination of the engagement or the disengagement of the clutch disc. Therefore, the clutch engagement/disengagement determination prohibiting means 36 outputs the determination-suspending signal or the determination-prohibiting signal to the clutch engagement/disengagement determining means 35 to suspend or prohibit the determination of the engagement or the disengagement of the clutch disc if the brake signal (the brake-ON signal) outputted by the brake switch 26 is inputted or if the brake lamp is turned on.

When the clutch engagement/disengagement determination prohibiting means 36 determines that the power for varying the engine rotation speed $\omega$ is transmitted from neither the engine 2 side nor the power transmission system side, or if the clutch engagement/disengagement determination prohibiting means 36 outputs neither the determination-suspending signal nor the determination-prohibiting signal, the clutch engagement/disengagement determining means 35 determines the disengagement of the clutch disc based on the vehicle speed signal, the accelerator position signal ACCP, the command injection quantity QFIN, the engine rotation speed variation $\Delta\omega$, the engine accessory load fluctuation, and the brake signal (the brake-ON signal or the brake-OFF signal), without using the shift operation switches such as the clutch switch or the neutral position switch. The vehicle speed signal is outputted by the vehicle speed sensor 24. The accelerator position signal ACCP is outputted by the accelerator position sensor 22. The command injection quantity QFIN is calculated by the injection quantity determining means 32. The engine rotation speed variation $\Delta\omega$ is calculated by the rotation speed variation calculating means 33. The engine accessory load fluctuation is sensed by the engine accessory load fluctuation sensing means 34. The brake signal is outputted by the brake switch 26, which detects the pressed state of the brake pedal.

Figure 5:
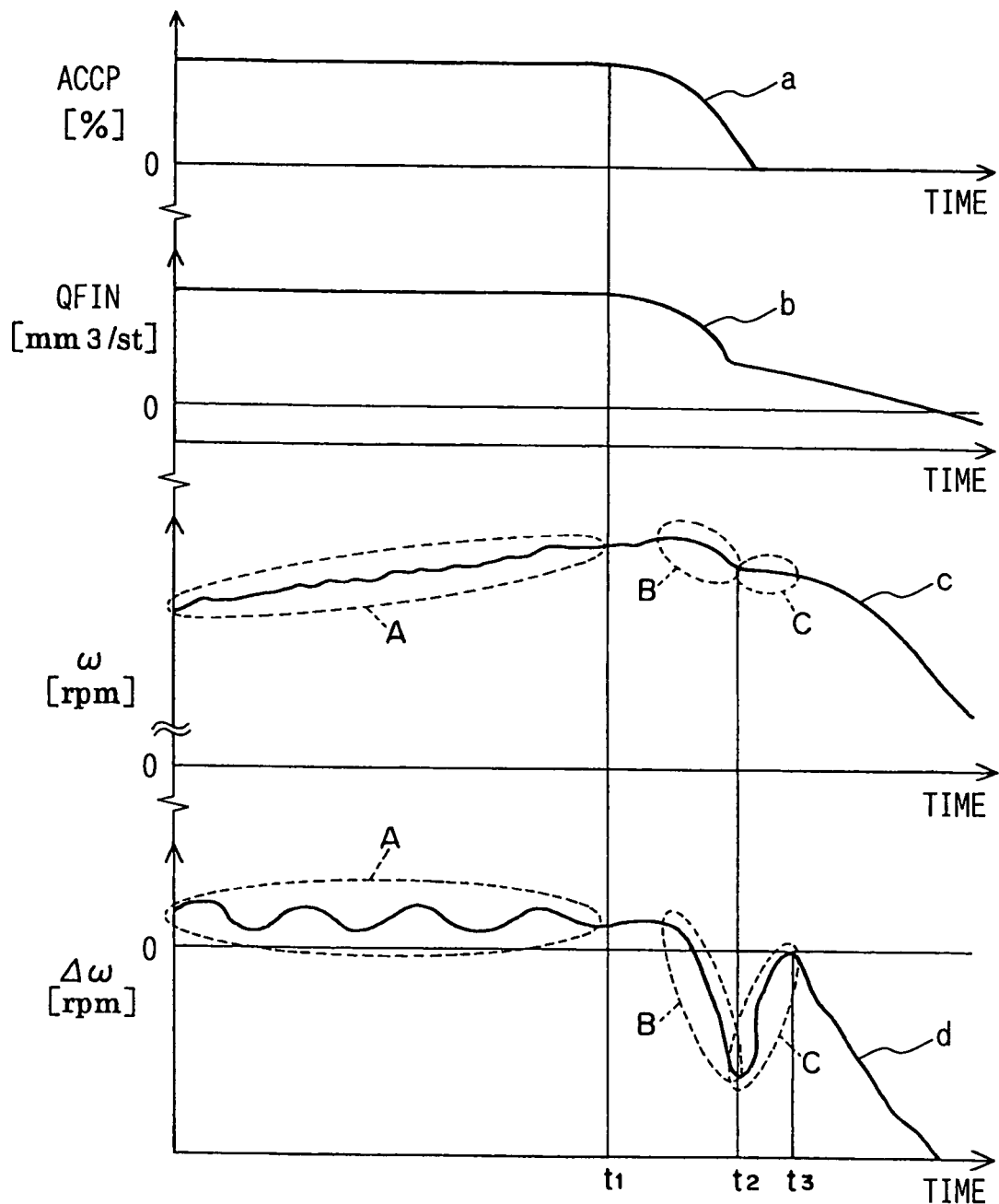
FIG. 5 is a time chart showing transitions of operating states of the engine according to the first embodiment.

The clutch engagement/disengagement determining means 35 arranges the values of the engine rotation speed variation $\Delta\omega$ of the cylinders of the engine 2, which are calculated by the rotation speed variation calculating means 33, in time sequence in accordance with the order of the injections as shown by a solid line "d" in FIG. 5. Then, the clutch engagement/disengagement determining means 35 calculates a decreasing rate of the instantaneous rotation speed (the engine rotation speed) $\omega$ of a certain injection cylinder out of the entire cylinders of the engine 2 based on a difference $\{(\Delta\omega i)-(\Delta\omega i-1)\}$ between the engine rotation speed variation $\Delta\omega i$ of the certain injection cylinder (the present injection cylinder) and the engine rotation speed variation $\Delta\omega i-1$ of a immediately preceding injection cylinder, in which the fuel injection is performed immediately before the injection performed in the certain injection cylinder.

In the present embodiment, the four-cylinder engine 2 is employed. Therefore, as shown in FIG. 2, when the certain injection cylinder is the first cylinder #1, the immediately preceding injection cylinder is the second cylinder #2. When the certain injection cylinder is the third cylinder #3, the immediately preceding injection cylinder is the first cylinder #1. When the certain injection cylinder is the fourth cylinder #4, the immediately preceding injection cylinder is the third cylinder #3. When the certain injection cylinder is the second cylinder #2, the immediately preceding injection cylinder is the fourth cylinder #4.

In the present embodiment, it is determined that the user presses the clutch pedal so that the clutch disc is completely disengaged from the flywheel if a first phenomenon in which the decreasing rate of the engine rotation speed $\omega$ corresponding to at least one specific cylinder (a first specific cylinder) out of the entire cylinders of the engine 2 becomes greater than a first determination value is detected, and if a second phenomenon in which the decreasing rate of the engine rotation speed $\omega$ of at least one specific cylinder (a second specific cylinder) out of the entire cylinders becomes less than a second determination value is detected after the first phenomenon is detected and a certain condition is established. For instance, the first determination value is a decreasing rate of the engine rotation speed $\omega$ corresponding to an immediately preceding injection cylinder, in which the fuel is injected immediately before the injection performed in the first specific cylinder. The second determination value is the decreasing rate of the engine rotation speed $\omega$ corresponding to an immediately preceding injection cylinder, in which the fuel is injected immediately before the injection performed in the second specific cylinder.

Next, a method of determining the engagement or the disengagement of the clutch disc according to the present embodiment will be explained based on FIG. 5. Solid lines "a", "b", "c" and the solid line "d" in FIG. 5 respectively indicate behaviors of the accelerator position ACCP, the command injection quantity QFIN, the engine rotation speed $\omega$ and the engine rotation speed variation $\Delta\omega$ provided when the clutch disc is changed from the engaged state to the disengaged state.

The engine rotation speed variation $\Delta\omega$ between the present value of the engine rotation speed $\omega$ sensed at the present time and the previous value of the engine rotation speed $\omega$ sensed at a time point prior to the present time by 720° C.A is shown by the solid line "d" in FIG. 5. The solid line "d" in FIG. 5 is provided by arranging and plotting the values of the engine rotation speed variation $\Delta\omega$, which are calculated by the rotation speed variation calculating means 33, in time sequence in accordance with the order of the fuel injections. The engine rotation speed variation $\Delta\omega$ is a variation of the engine rotation speed $\omega$ caused during the predetermined sampling interval (the predetermined interval of 720° C.A, in the present embodiment). Therefore, if the engine rotation speed variation $\Delta\omega$ is greater than zero, it can be determined that the engine rotation speed $\omega$ has increased during the last 720° C.A. When the certain injection cylinder is the first cylinder #1, it is determined that the engine rotation speed $\omega$ has increased to the present value $\omega n(\#1)$ from the previous value $\omega n-4(\#1)$, which is sensed at a time point prior to the present time by 720° C.A. If the engine rotation speed variation $\Delta\omega$ is less than zero, it can be determined that the engine rotation speed $\omega$ has decreased during the last 720° C.A. When the injection cylinder is the first cylinder #1, it is determined that the engine rotation speed ω has decreased from the previous value ωn−4(#1) to the present value ωn(#1).

The determination of the engagement (or the disengagement) of the clutch disc is performed for each fuel injection when the vehicle is traveling and the user is not accelerating the vehicle (the accelerator position ACCP is equal to or less than zero). If the vehicle travels in a state in which the shift lever is positioned in a certain manipulation position other than the neutral position (N) and the clutch disc is engaged with the flywheel (the clutch is engaged), twisting vibration in which the engine rotation speed ω fluctuates with certain amplitude is detected as shown by a part "A" of the solid line "c" in FIG. 5. The solid line "c" in FIG. 5 is provided by arranging and plotting the values of the instantaneous rotation speed (the engine rotation speed ω) corresponding to the cylinders, which are measured by the engine rotation speed sensing means 31, in time sequence in accordance with the order of the fuel injections. In this case, twisting vibration in which the engine rotation speed variation Δω fluctuates with certain amplitude is also detected as shown by a part "A" of the solid line "d" in FIG. 5.

If the user presses the clutch pedal to disengage the clutch disc and to perform gear-shifting operation (a shift change: up-shift or down-shift) while the vehicle is traveling, a phenomenon B in which the engine rotation speed variation Δω rapidly decreases between two successive cylinders performing the fuel injections successively occurs as shown by a part "B" of the solid line "d" in FIG. 5. Then, a phenomenon C in which the engine rotation speed variation ω rapidly increases between another two successive cylinders occurs as shown by a part "C" of the solid line "d" in FIG. 5. If the clutch disc, which has been engaged with the flywheel rotating with the engine 2, is brought to the partial clutch engagement, the clutch disc slides on the end surface of the flywheel and causes friction. Thus, the phenomenon B in which the decreasing rate of the engine rotation speed ω0 rapidly increases occurs as shown by a part "B" of the solid line "c", or the part "B" of the solid line "d" in FIG. 5. Then, if the clutch disc is completely disengaged from the flywheel and the friction is eliminated, the decreasing rate of the engine rotation speed ω returns to the original state provided before the clutch disc is disengaged. Thus, the phenomenon C in which the decreasing rate of the engine rotation speed ω rapidly decreases occurs as shown by a part "C" of the solid line "c" or the part "C" of the solid line "d" in FIG. 5.

The clutch engagement/disengagement determining means 35 detects the phenomenon B shown by the part "B" of the solid line "c" or the solid line "d" in FIG. 5, and then, the clutch engagement/disengagement determining means 35 detects the phenomenon C shown by the part "C" of the solid line "c" or the solid line "d" in FIG. 5. Thus, the disengagement caused when the user presses the clutch pedal to completely disengage the clutch disc from the flywheel can be detected accurately without using the shift operation switch such as the clutch switch or the neutral position switch. Thus, the switch equipment of the shift operation switch such as the clutch switch or the neutral position switch is unnecessary. Accordingly, adjustment performed after the shift operation switch is mounted is unnecessary. As a result, the cost and the number of man-hours can be reduced.

The phenomenon C shown by the part "C" of the solid line "c" or the solid line "d" in FIG. 5 occurs when the clutch disc is disengaged. A behavior of the engine rotation speed ω similar to that of the phenomenon C occurs when the engine torque is generated by the fuel injection (Factor I), when the external load of the engine accessory such as the alternator load Lalt, the pump load Lpmp or the air conditioner load Lac changes (specifically, decreases) (Factor II), when the vehicle speed SPD is increased because the vehicle travels on the downward slope (Factor III), when the user releases the brake pedal after pressing the brake pedal (Factor IV), or when the state of the clutch disc changes from the partial clutch engagement to the engaged state (Factor V).

It can be determined whether or not the phenomenon C shown by the part "C" of the solid line "c" or the solid line "d" is due to Factor I, by monitoring the command injection quantity QFIN set in accordance with the operating state of the engine 2. For instance, it can be determined whether or not the phenomenon C is due to Factor I, based on whether or not the command injection quantity QFIN, which is set in accordance with the engine rotation speed ω and the accelerator position ACCP, is increasing, or based on whether or not the command injection period TQ, which is set in accordance with the command injection quantity QFIN and the common rail pressure PC, is lengthening. It can be determined whether or not the phenomenon C is due to Factor II, by monitoring a duty ratio of the alternator, a fuel discharge quantity of the supply pump 5 (specifically, the pump pressure-feeding period), or the behavior of the air conditioner signal outputted by the air conditioner switch (a change from the OFF-signal to the ON-signal or a change from the ON-signal to the OFF-signal). It can be determined whether or not the phenomenon C is due to Factor III, by monitoring a change in the vehicle speed SPD based on the vehicle speed signal outputted by the vehicle speed sensor 24. More specifically, when the clutch disc is in the disengaged state, the engine rotation speed variation Δω decreases even if the vehicle speed SPD increases. However, if the clutch disc is in the engaged state, the vehicle speed SPD and the engine rotation speed variation Δω increase together.

It can be determined whether or not the phenomenon C is due to Factor IV, by monitoring the behavior of the brake signal outputted by the brake switch 26 (the change from the brake-OFF signal to the brake-ON signal and to the brake-OFF signal again) or by monitoring the phenomenon in which the brake lamp is turned off after the brake lamp is turned on. It can be determined whether or not the phenomenon C is due to Factor V, based on the increase in the engine rotation speed variation Δω. However, there is a possibility that the determination is difficult at a time point when the engine rotation speed variation Δω increases. Therefore, even if it is determined that the clutch disc is in the disengaged state, the monitoring of the behavior of the engine rotation speed ω and the behavior of the engine rotation speed variation Δω of the cylinders of the engine 2 should be preferably continued. Then, the determination should be preferably performed based on whether or not the twisting vibration is observed as shown by the part "A" of the solid line "c" or the solid line "d" in FIG. 5 if the values of the engine rotation speed ω or the values of the engine rotation speed variation Δω of the cylinders of the engine 2 are arranged in time sequence in accordance with the order of the fuel injections. Thus, it is determined that the clutch disc is in the engaged state when the phenomenon C due to any one of Factors I to V occurs after the phenomenon B shown by the part "B" of the solid line "c" or the solid line "d" in FIG. 5. Thus, erroneous determination of the engagement of the clutch disc can be prevented.

Next, a method of determining the engagement or the disengagement of the clutch disc will be explained based on FIGS. 3 and 5. If the user starts releasing the accelerator at a time point t1 in FIG. 5 to perform the gear-shifting operation (the shift change: the up-shift or the down-shift) while the vehicle is traveling, the command injection quantity QFIN outputted to the injector 4 starts decreasing correspondingly and the increase in the engine rotation speed ω slackens. If the command injection quantity QFIN keeps decreasing, the engine rotation speed ω stops increasing and starts decreasing. At that time, the vehicle speed SPD is greater than a specified value and the command injection quantity QFIN is being decreased, and the accelerator position ACCP is being decreased. Therefore, it is determined that the vehicle is traveling and the user is not accelerating the vehicle. Then, the determination of the engagement or the disengagement of the clutch disc is performed as follows.

If the user starts disengaging the clutch disc, the phenomenon B in which the decreasing rate of the engine rotation speed ω is increased by the frictional load due to the partial clutch engagement occurs as shown by the part "B" of the solid line "c" or the solid line "d" in FIG. 5. At that time, the engine rotation speed variation Δω becomes negative. Then, if the clutch disc is disengaged at a time point t2, the applied frictional load is eliminated and the phenomenon C in which the decreasing rate of the engine rotation speed ω decreases in accordance with the elimination of the frictional load occurs as shown by the part "C" of the solid line "c" or the solid line "d" in FIG. 5. At that time, the clutch engagement/disengagement determining means 35 determines whether or not the phenomenon C is due to any one of Factors I to V. Factor I is determined based on the change in the command injection quantity QFIN calculated by the injection quantity determining means 32. Factor II is determined with the use of the engine accessory load fluctuation sensing means 34. Factor III is determined with the use of the vehicle speed sensor 24 and the rotation speed variation calculating means 33. Factor IV is determined with the use of braking force sensing means. Factor V is determined with the use of the rotation speed variation calculating means 33. If it is determined that the phenomenon C is not due to any one of Factors I to V, it is determined that the clutch disc is disengaged. However, there is a possibility that the determination is performed erroneously because of Factor V, for instance. Therefore, the rotation speed variation calculating means 33 keeps monitoring the engine rotation speed variation Δω even after a time point t3 to determine whether or not the twisting vibration shown by the part "A" in FIG. 5 occurs. If it is determined that the twisting vibration occurs, the result of the determination that the clutch disc is disengaged is corrected immediately.

Also in the case where the clutch disc is engaged, the engagement or the disengagement of the clutch disc is determined by sensing the engine rotation speed variation Δω as in the case of the method of determining the disengaged state of the clutch disc. For instance, if the user engages the clutch disc without adjusting the engine rotation speed ω by pressing the accelerator when the user performs the shift change, the engine rotation speed ω largely and excessively increases to a degree that the engine rotation speed variation Δω becomes greater than zero. It is because the engine rotation speed ω has been lower than a certain engine rotation speed suitable for the vehicle speed SPD. Based on this fact, the phenomenon occurring when the clutch disc is engaged can be distinguished from the phenomenon occurring when the clutch disc is disengaged.

In the present embodiment, if the external load of the engine accessory fluctuates by at least a predetermined value, or if the load fluctuation sensed by the engine accessory load fluctuation sensing means 34 is equal to or greater than the predetermined value, the determination of the engagement or the disengagement of the clutch disc performed by the clutch engagement/disengagement determining means 35 is suspended or prohibited. Thus, the erroneous determination of erroneously determining that the clutch disc is disengaged even though the clutch disc is engaged can be prevented.

In the present embodiment, the determination of the engagement or the disengagement of the clutch disc performed by the clutch engagement/disengagement determining means 35 is suspended or prohibited if the user presses the brake pedal and if the brake signal (the ON-signal) outputted by the brake switch 26 is inputted, or if the brake lamp is turned on. Thus, the erroneous determination of erroneously determining that the clutch disc is disengaged even though the clutch disc is engaged can be prevented.

If the vehicle is traveling on the upward slope and the vehicle is being decelerated, the determination of the engagement or the disengagement of the clutch disc is suspended or prohibited. Thus, the erroneous determination of determining that the phenomenon, in which the decreasing rate of the instantaneous rotation speed ω increases due to the change of the state of the clutch disc from the engaged state to the disengaged state, is detected can be prevented. Thus, the condition, under which the erroneous determination preventing means for preventing the erroneous determination related to the slope functions, can be further clarified. If the vehicle is traveling on the downward slope and the vehicle is being accelerated, the determination of the engagement or the disengagement of the clutch disc is suspended or prohibited. Thus, the erroneous determination of determining that the phenomenon, in which the decreasing rate of the instantaneous rotation speed ω decreases after the disengagement of the clutch disc, is detected can be prevented. Thus, the condition, under which the erroneous determination preventing means for preventing the erroneous determination related to the slope functions, can be further clarified. If the command injection quantity QFIN or the command injection period TQ increases by at least a predetermined value, the determination of the engagement or the disengagement of the clutch disc is suspended or prohibited. Thus, the erroneous determination of determining that the clutch disc is in the disengaged state even though the clutch disc is in the engaged state can be prevented. Any one of the above means for preventing the erroneous determination of the disengagement of the clutch disc may be selected and used. Alternatively, any combination of two or more means for preventing the erroneous determination explained above may be selected and used.

In the present embodiment, it is determined that the clutch disc is brought to the disengaged state if the phenomenon B is detected and the phenomenon C is detected successively. Alternatively, it may be determined that the clutch disc is brought to the disengaged state when only the phenomenon C is detected. Alternatively, it may be determined that the clutch disc is being changed from the engaged state to the disengaged state when only the phenomenon B is detected. In the present embodiment, the engine accessory load fluctuation sensing means 34 senses the fluctuation of the alternator load Lalt of the alternator, the pump load Lpmp of the supply pump 5, or the air conditioner load Lac of the air conditioner. Since the engine accessory load fluctuation sensing means 34 is the erroneous determination preventing means for preventing the erroneous determination of the disengagement of the clutch disc, the engine accessory load fluctuation sensing means 34 may not be used necessarily. To the contrary, in order to reduce the erroneous determination of the disengagement of the clutch disc, additional engine accessory load fluctuation sensing means for sensing fluctuations in a load of a pump used for power steering, a load of an actuator of a power window, loads of electric parts such as a headlight, and the like may be used.

(Second Embodiment)

Figure 6:
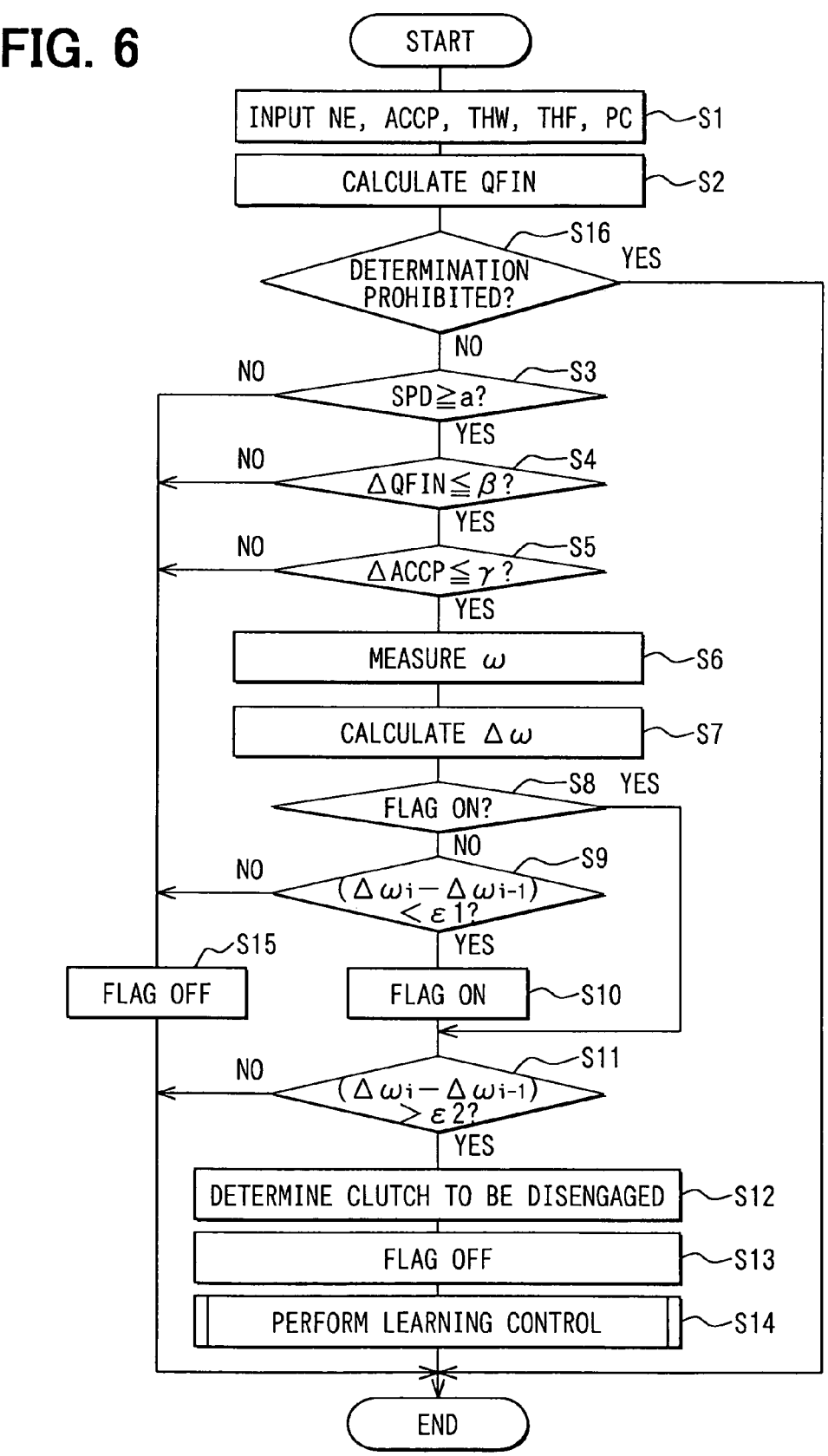
FIG. 6 is a flowchart showing a method of determining disengagement of a clutch disc according to a second embodiment of the present invention.

Next, a method of determining the disengagement of the clutch disc according to a second embodiment of the present invention will be explained based on FIGS. 6 and 7. A routine shown by a flowchart of FIG. 6 is executed at every predetermined timing (at every 180° C.A, or every time the fuel injection is performed in each cylinder of the engine 2, for instance) after the ignition switch is turned on (IG-ON).

First, in Step S1, the rotation signal pulse NE and the engine parameters such as the accelerator position ACCP, the engine cooling water temperature THW, the fuel temperature THF, and the common rail pressure PC are inputted. A solid line "a" in FIG. 7 is provided by plotting the values of the accelerator position ACCP sensed by the accelerator position sensor 22 in time sequence in accordance with the order of the fuel injections. The behavior of the accelerator position ACCP shown by the solid line "a" in FIG. 7 is provided when the user operates the accelerator and the clutch pedal to change the clutch from the engaged state to the disengaged state for the purpose of performing the gear-shifting operation (the up-shift or the down-shift) while the vehicle is traveling.

Then, in Step S2 (injection quantity determining means), the command injection quantity QFIN is calculated by adding a correction value to a basic injection quantity Q. The basic injection quantity Q is set in accordance with an engine rotation speed NE, which is calculated based on the rotation signal pulses NE outputted by the engine rotation speed sensing means such as the crank angle sensor 21, and the accelerator position ACCP sensed by the accelerator position sensing means such as the accelerator position sensor 22. The correction value is calculated in accordance with the engine cooling water temperature THW and the fuel temperature THF. A solid line "c" in FIG. 7 is provided by plotting the values of the command injection quantity QFIN calculated by the injection quantity determining means in time sequence in accordance with the order of the fuel injections. The behavior of the command injection quantity QFIN shown by the solid line "c" in FIG. 7 is provided when the user operates the accelerator and the clutch pedal to change the clutch from the engaged state to the disengaged state for the purpose of performing the gear-shifting operation (the up-shift or the down-shift) while the vehicle is traveling.

Then, in Step S16, it is determined whether or not power for varying the engine rotation speed NE is transmitted from the engine 2 side or from the power transmission system side. If the result of the determination in Step S16 is "YES", the determination of the engagement or the disengagement of the clutch disc is suspended or prohibited, and the routine shown in FIG. 6 is ended.

If the result of the determination in Step S16 is "NO", it is determined whether the vehicle speed SPD sensed by the vehicle speed sensing means such as the vehicle speed sensor 24 is "equal to or greater than" a specified value "a" in Step S3. If the result of the determination in Step S3 is "NO" and a control flag is ON, the control flag is turned off in Step S15. Then, the routine shown in FIG. 6 is ended.

If the result of the determination in Step S3 is "YES", it is determined whether the command injection quantity QFIN is on a decline, or whether a change $\Delta$QFIN in the command injection quantity QFIN is "equal to or less than" a predetermined value $\beta$ in Step S4. If the result of the determination in Step S4 is "NO", the processing of Step S15 is performed and the routine shown in FIG. 6 is ended.

If the result of the determination in Step S4 is "YES", it is determined whether the accelerator position ACCP is approaching a closed position, or whether a change $\Delta$ACCP in the accelerator position ACCP is "equal to or less than" a predetermined value $\gamma$ in Step S5. If the result of the determination in Step S5 is "NO", the processing of Step S15 is performed and the routine shown in FIG. 6 is ended.

If the result of the determination in Step S5 is "YES", it is determined that the vehicle is traveling and the user is not accelerating the vehicle. Then, the determination of the engagement or the disengagement of the clutch disc is performed as follows.

In Step S6, the engine rotation speed $\omega$ corresponding to each cylinder is measured by the engine rotation speed sensing means. The engine rotation speed sensing means measures time intervals among the rotation signal pulses NE outputted by the crank angle sensor 21 and takes in an average of the time intervals among the rotation signal pulses NE provided during a predetermined crank angle period (a period from BTDC90° to ATDC90°) as an average instantaneous rotation speed of the injection cylinder (referred to as a sensing period average rotation speed or an engine rotation speed $\omega$, hereafter). A solid line "b" shown in FIG. 7 is provided by plotting the values of the engine rotation speed $\omega$ measured by the engine rotation speed sensing means in time sequence in accordance with the order of the fuel injections. The behavior of the engine rotation speed $\omega$ shown by the solid line "b" in FIG. 7 is provided when the user operates the accelerator and the clutch pedal to change the clutch from the engaged state to the disengaged state for the purpose of performing the gear-shifting operation (the up-shift or the down-shift) while the vehicle is traveling. The values of the engine rotation speed $\omega$ of the respective cylinders measured by the engine rotation speed sensing means are written into a characteristic diagram (for instance, a map shown in FIG. 4B) stored in a memory such as RAM or a non-volatile memory such as EEPROM or stand-by RAM in time sequence in accordance with the order of the fuel injections by rotation speed storing means until a predetermined number of the values is accumulated.

Then, in Step S7, based on a variation between the value of the engine rotation speed $\omega$ measured at a start of a predetermined sampling interval (720° C.A, in the present embodiment) and the value of the engine rotation speed $\omega$ measured at an end of the predetermined sampling interval, an engine rotation speed variation $\Delta\omega$ is calculated by engine rotation speed variation calculating means for each cylinder. The behavior of the engine rotation speed variation $\Delta\omega$ shown by a solid line "d" in FIG. 7 is provided by plotting the values of the engine rotation speed variation $\Delta\omega$ of the cylinders in time sequence in accordance with the order of the fuel injections. The behavior shown by the solid line "Id" in FIG. 7 is provided when the user operates the accelerator and the clutch pedal to change the clutch from the engaged state to the disengaged state for the purpose of performing gear-shifting operation (the up-shift or the down-shift). The values of the engine rotation speed variation $\Delta\omega$ of the respective cylinders calculated by the engine rotation speed variation calculating means are written into a characteristic diagram (for instance, the map shown in FIG.

4B) stored in the memory such as RAM or a non-volatile memory such as EEPROM or stand-by RAM in time sequence in accordance with the order of the fuel injections by rotation speed variation storing means until a predetermined number of the values is accumulated.

Then, it is determined whether the control flag is ON in Step S8. If the result of the determination in Step S8 is "YES", the program proceeds to Step S11.

If the result of the determination in Step S8 is "NO", it is determined whether a value calculated by subtracting a value $\Delta\omega i-1$ of the engine rotation speed variation $\Delta\omega$ corresponding to an immediately preceding injection cylinder #n−1, in which the injection is performed immediately before the injection performed in a present injection cylinder #n, from a value $\Delta\omega i$ of the engine rotation speed variation $\Delta\omega$ corresponding to the present injection cylinder #n is less than a first determination value $\epsilon 1$ in Step S9. The first determination value $\epsilon 1$ should be preferably calculated by a following equation (1).

$$\epsilon 1 = \{(\Delta\omega i-1)-(\Delta\omega i-2)\} \times C1, \quad (1)$$

In the equation (1), $\Delta\omega i-2$ represents a value of the engine rotation speed variation $\Delta\omega$ corresponding to an injection cylinder #n−2, in which the injection is performed immediately before the injection performed in the cylinder #n−1, and C1 is a correction coefficient equal to or greater than one (for instance, 1.5). The effect achieved by the above method is the same as the effect of a method of calculating a decreasing rate of the engine rotation speed ω corresponding to the present injection cylinder based on a value calculated by subtracting the value $\Delta\omega i-1$ from the value $\Delta\omega i$ of the engine rotation speed variation $\Delta\omega$ and of detecting a phenomenon in which the decreasing rate of the engine rotation speed ω of the injection cylinder rapidly increases.

If the result of the determination in Step S9 is "NO", the processing of Step S15 is performed and the routine shown in FIG. 6 is ended.

If the result of the determination in Step S9 is "YES", the control flag is turned on in Step S10. Then, it is determined whether the value calculated by subtracting the value $\Delta\omega i-1$ of the engine rotation speed variation $\Delta\omega$ corresponding to the immediately preceding injection cylinder #n−1 from the value $\Delta\omega i$ corresponding to the present injection cylinder #n is greater than a second determination value $\epsilon 2$ in Step S11. The second determination value $\epsilon 2$ should be preferably calculated by a following equation (2).

$$\epsilon 2 = \{(\Delta\omega i-1)-(\Delta\omega i-2)\} \times C2, \quad (2)$$

In the equation (2), C2 represents a correction coefficient equal to or greater than one (for instance, 1.5). The effect achieved by the above method is the same as the effect of a method of calculating a decreasing rate of the engine rotation speed ω corresponding to the present injection cylinder based on a value calculated by subtracting the value $\Delta\omega i-1$ from the value $\Delta\omega i$ of the engine rotation speed variation $\Delta\omega$ and of detecting a phenomenon in which the decreasing rate of the engine rotation speed ω of the injection cylinder rapidly decreases.

If the result of the determination in Step S11 is "NO", the routine shown in FIG. 6 is ended.

If the result of the determination in Step S11 is "YES", it is determined that the clutch disc is in a disengaged state in Step S12. Then, the control flag is turned off in Step S13. Then, in Step S14, it is determined that the clutch pedal is pressed to completely disengage the clutch disc and the gear-shifting operation is being performed while the vehicle is traveling. Meanwhile, in Step S14, learning control of the fuel injection quantity is performed, for instance. Then, the routine shown in FIG. 6 is ended.

Figure 7:
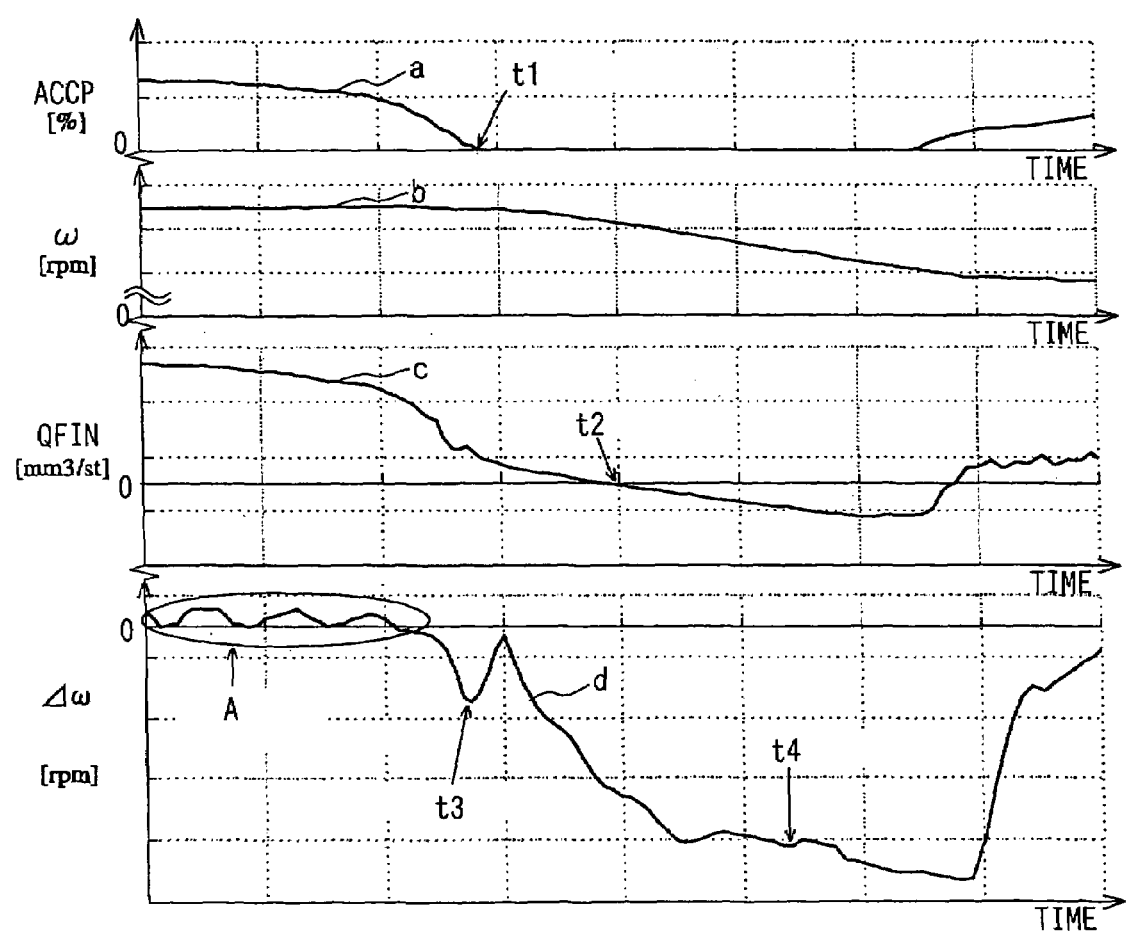
FIG. 7 is a time chart showing transitions of operating states of an engine according to the second embodiment.

In the present embodiment, if the shift lever is positioned at a certain manipulation position other than the neutral position (N) and the clutch disc is engaged with the flywheel while the vehicle is traveling, the twisting vibration is detected as shown by a part "A" of a solid line "d" in FIG. 7. If the user presses the clutch pedal and disengages the clutch disc to perform the gear-shifting operation (the up-shift or the down-shift), a phenomenon in which the engine rotation speed variation $\Delta\omega$ rapidly decreases between the cylinders of the engine 2 occurs at a time point t3 in FIG. 7. Then, a phenomenon in which the engine rotation speed variation $\Delta\omega$ rapidly increases between the cylinders of the engine 2 occurs as shown by the solid line "d" in FIG. 7. If these two phenomena are detected, it is determined that the clutch is in the disengaged state.

If the ECU 10 determines that a learning condition is established, the ECU 10 performs the learning control of the fuel injection quantity. The learning condition is established if a state in which the accelerator position ACCP is 0%, a state in which the clutch is disengaged, a state in which the fuel injection pressure resides within a predetermined range, and a state in which the command injection quantity QFIN is a no-injection quantity (0 mm$^3$/st or under) are detected. The accelerator is fully closed, or the accelerator position ACCP becomes zero, at a time point t1 shown in FIG. 7. The command injection quantity QFIN becomes zero or under at a time point t2 shown in FIG. 7. In the learning control, a pulse-shaped injector-driving current is supplied to the electromagnetic valve of the injector 4 until a learning control period corresponding to a learning injection quantity elapses after injection start timing t4 shown in FIG. 7. Thus, the fuel is injected into the combustion chamber of a specific cylinder of the engine 2, and a variation of an actual injection quantity with respect to the learning injection quantity is measured. Thus, an individual difference of the injector 4 of the specific cylinder and an amount of deterioration with time or a secular change are learned. If the ECU 10 measures a learning value (a characteristic value) corresponding to the variation of the actual injection quantity with respect to the learning injection quantity, the ECU 10 stores the learning value in the non-volatile memory such as EEPROM in order to reflect the learning value in the following injection quantity control.

In the present embodiment, the disengagement of the clutch can be quickly determined based on the behavior of the engine rotation speed ω provided when the user presses the clutch pedal to perform the gear-shifting operation (the up-shift or the down-shift) while the vehicle is traveling, without using the shift operation switch such as the clutch switch or the neutral position switch. Therefore, a period, which can be used to perform the learning control, is not wasted in the case where the user performs the gear-shifting operation while the vehicle is traveling and the injection quantity learning control is performed during the gear-shifting operation.

In the present embodiment, the routine shown in FIG. 6 is executed at every predetermined timing (at every 180° C.A, or every time the fuel injection is performed in each cylinder of the engine 2, for instance). Alternatively, the routine shown in FIG. 6 may be performed when a crank angle corresponding to a control reference position for starting injection quantity control processing of the injector 4 mounted in a specific cylinder is detected. For instance, the routine of FIG. 6 may be executed for a certain cylinder when the fuel injection is ended in another cylinder, in which the fuel injection is performed earlier than the fuel injection in the certain cylinder by 720° C.A. Alternatively, the routine of FIG. 6 may be executed for a certain cylinder when the fuel injection is ended in an immediately preceding cylinder, in which the fuel injection is performed immediately before the fuel injection performed in the certain cylinder.

In the present embodiment, the present invention is applied to the determination of the disengagement of the clutch disc, which is used with the common rail type fuel injection system performing the learning control of the fuel injection quantity. Alternatively, the present invention may be applied to determination of disengagement of a clutch disc used with a system performing idling rotation speed control, engine start injection quantity control, uneven quantity compensation control, constant vehicle speed control, or pump learning control for learning an individual difference, an amount of deterioration with time or an amount of a secular change of the supply pump 5. Alternatively, the present invention may be applied to determination of disengagement of a clutch disc used with a vehicle speed control system including vehicle speed limiting means for limiting the vehicle speed by limiting the engine rotation speed or the fuel injection quantity if the vehicle speed higher than a predetermined target limit speed is detected.

(Third Embodiment)

Figure 8A:
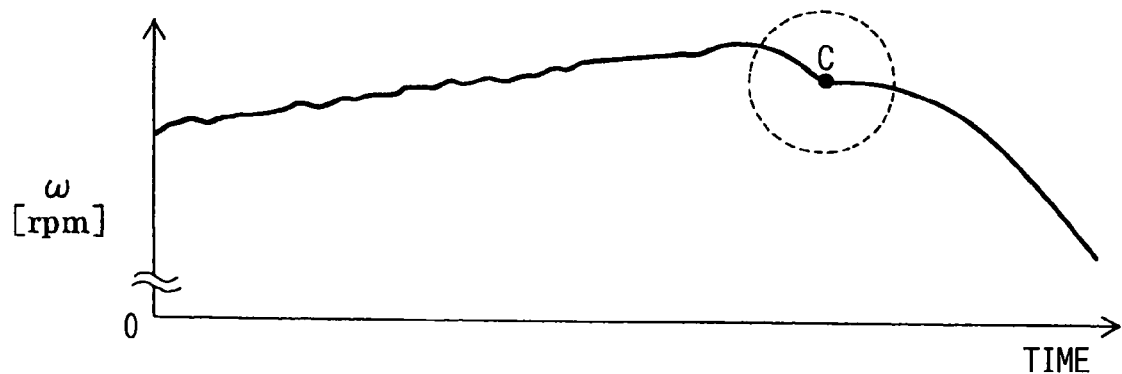
FIG. 8A is a time chart showing a transition of a rotation speed of an engine according to a third embodiment of the present invention.
Figure 8B:
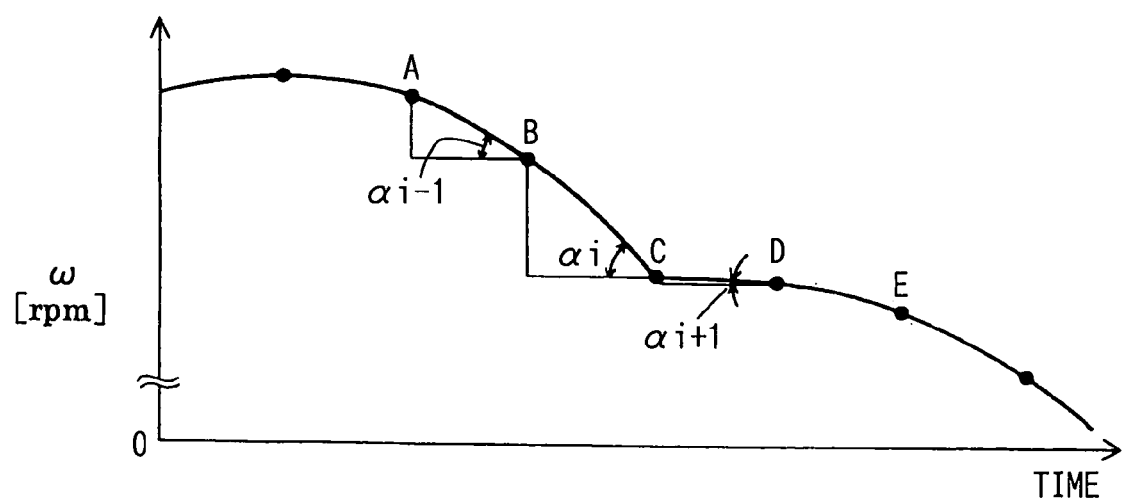
FIG. 8B is an enlarged diagram of the time chart of FIG. 8A.

Next, a method of determining the engagement or the disengagement of the clutch disc according to a third embodiment of the present invention will be explained based on FIGS. 8A and 8B.

In the present embodiment, a method of detecting a phenomenon in which the engine rotation speed $\omega$ is rapidly decreased by friction generated when the clutch disc connecting the engine 2 side with the transmission 8 side is disengaged and slides is employed as a method of detecting a phenomenon in which the decreasing rate of the instantaneous rotation speed $\omega$ of at least one specific cylinder out of the entire cylinders of the engine 2 rapidly increases over a first determination value. More specifically, a method of detecting a phenomenon in which a gradient of a change (a decrease gradient $\alpha$) of the engine rotation speed $\omega$ rapidly increases as shown by a solid line in FIG. 8B is employed. As shown in FIG. 8B, a value $\alpha i$ of the decrease gradient $\alpha$ between a point B and a point C is greater than another value $\alpha i-1$ of the decrease gradient $\alpha$ between a point A and the point B. Thus, the phenomenon in which the decreasing degree of the engine rotation speed $\omega$ becomes steep when the user presses the clutch pedal and brings the clutch disc to the partial clutch engagement to perform the gear-shifting operation (the up-shift or down-shift) while the vehicle is traveling can be detected.

In the present embodiment, a method of detecting a phenomenon in which the decrease gradient $\alpha$ of the engine rotation speed $\omega$ rapidly decreases when the clutch disc is completely disengaged to eliminate the friction is employed as a method of detecting a phenomenon in which the decreasing rate of the instantaneous rotation speed $\omega$ of at least one specific cylinder out of the entire cylinders of the engine 2 rapidly becomes less than a determination value. In FIG. 8B, a value $\alpha i+1$ of the decrease gradient a between the point C and a point D is smaller than the value $\alpha i$ of the decrease gradient $\alpha$ between the point B and the point C. Thus, the phenomenon in which the decreasing degree of the engine rotation speed $\omega$ is returning to the original state (the state provided before the clutch disc is disengaged) when the friction is eliminated by completely disengaging the clutch disc from the flywheel can be detected.

(Modifications)

In the above embodiments, the present invention is applied to the common rail type fuel injection system. Alternatively, the present invention may be applied to an internal combustion engine fuel injection system, which has no common rail and directly pressure-feeds the high-pressure fuel from a fuel supply pump to fuel injection valves or fuel injection nozzles through high-pressure fuel supply pipes. Alternatively, the present invention may be applied to an internal combustion engine fuel injection system including injection rate controlling means for performing multi-injection for injecting the high-pressure fuel into the combustion chamber of each cylinder of the engine 2 in two or more times by driving the electromagnetic valve of the injector 4 at least twice during a compression stroke and an expansion stroke of the engine 2. In this case, the fuel injection system may perform a multi-injection including at least one pilot injection or pre-injection before a main injection, or a multi-injection including at least one after injection after the main injection. Learning control of a small quantity fuel injection such as the pilot injection, the pre-injection or the after injection may be performed as the fuel injection quantity learning control.

In the present embodiment, an averaged value of the time intervals among the rotation signal pulses NE provided during a predetermined crank angle period (a period from BTDC90° C.A to ATDC90° C.A) is inputted as the average instantaneous rotation speed of the injection cylinder (the sensing period average rotation speed). Alternatively, the maximum time interval of the rotation signal pulses NE in the predetermined crank angle period (the period from BTDC90° C.A to ATDC90° C.A) may be inputted as the lowest instantaneous rotation speed of the injection cylinder. Alternatively, the minimum time interval of the rotation signal pulses NE in the predetermined crank angle period (the period from BTDC90° C.A to ATDC90° C.A) may be inputted as the highest instantaneous rotation speed of the injection cylinder.

In the above embodiments, the present invention is applied to the method of determining the disengagement of the clutch, which provides the engagement or the disengagement between the four-cylinder engine and the transmission. Alternatively, the present invention may be applied to a method of determining disengagement of a clutch for providing engagement or disengagement between a multi-cylinder engine having six cylinders or more, and a transmission. The present invention may be applied to a method of determining disengagement of a clutch, which provides engagement or disengagement between a gasoline engine and a transmission. The present invention is applied to the engine 2 mounted in the heavy-duty vehicle. Alternatively, the present invention may be applied to a method of determining disengagement of a clutch, which provides engagement or disengagement between an engine and a transmission mounted in a small-sized vehicle such as a passenger car or a commercial vehicle.

The present invention should not be limited to the disclosed embodiments, but may be implemented in many other ways without departing from the spirit of the invention.

What is claimed is:

1. A clutch state determining device for determining engagement or disengagement of a clutch, which provides or interrupts transmission of rotating power from a driving part to a driven part, the clutch state determining device comprising:

sensing means for sensing a rotation speed of the driving part;

prohibiting means for suspending or prohibiting the determination of the engagement or the disengagement of the clutch if power for varying the rotation speed of the driving part is transmitted from the driving part or the driven part; and determining means for determining whether the clutch is in a disengaged state based on the variation in the rotation speed of the driving part sensed by the sensing means when the prohibiting means determines that neither the driving part nor the driven part transmits the power for varying the rotation speed of the driving part, wherein the driving part is an engine mounted in a vehicle, the driven part is a power transmission system for transmitting the rotating power of the engine to wheels, and the sensing means includes a rotation speed sensor for sensing an instantaneous rotation speed provided by each one of cylinders of the engine.

2. The clutch state determining device as in claim 1, wherein the prohibiting means employs a slope resistance caused when the vehicle travels on a slope as the power, which is transmitted from the driven part and varies the rotation speed of the driving part, and the prohibiting means suspends or prohibits the determination of the engagement or the disengagement of the clutch if the vehicle is traveling on an upward slope and the vehicle is decelerating.

3. The clutch state determining device as in claim 1, wherein the prohibiting means employs a slope resistance caused when the vehicle travels on a slope as the power, which is transmitted from the driven part and varies the rotation speed of the driving part, and the prohibiting means suspends or prohibits the determination of the engagement or the disengagement of the clutch if the vehicle is traveling on a downward slope and the vehicle is accelerating.

4. The clutch state determining device as in claim 1, wherein the prohibiting means employs an injection quantity of the fuel injected into the cylinder of the engine to generate torque of an output shaft of the engine as a factor related to the power, which is transmitted from the driving part and varies the rotation speed of the driving part, and the prohibiting means suspends or prohibits the determination of the engagement or the disengagement of the clutch if a command injection quantity or a command injection period set in accordance with an operating state of the engine increases by at least a predetermined value.

5. The clutch state determining device as in claim 1, wherein the prohibiting means employs an external load of an engine accessory driven by an output shaft of the engine as the power, which is transmitted from the driving part and varies the rotation speed of the driving part, and the prohibiting means suspends or prohibits the determination of the engagement or the disengagement of the clutch if the external load of the engine accessory fluctuates by at least a predetermined value.

6. The clutch state determining device as in claim 1, wherein the prohibiting means employs a braking force generated when the vehicle is braked while the vehicle is traveling as the power, which is transmitted from the driven part and varies the rotation speed of the driving part, and the prohibiting means suspends or prohibits the determination of the engagement or the disengagement of the clutch if a vehicle driver operates a brake pedal or if a brake lamp is turned on.

7. The clutch state determining device as in claim 1, wherein the determining means arranges values of the instantaneous rotation speeds corresponding to the respective cylinders of the engine sensed by the sensing means in time sequence in accordance with an order of the fuel injections, and the determining means determines that the clutch is in the engaged state if an existence of twisting vibration is shown by the arranged values of the instantaneous rotation speed.

8. The clutch state determining device as in claim 1, wherein the determining means determines that the clutch is in the disengaged state if the determining means detects a phenomenon in which a decreasing rate of the instantaneous rotation speed provided by at least one first specific cylinder out of the entire cylinders of the engine becomes greater than a first determination value, and if the determining means successively detects another phenomenon in which the decreasing rate of the instantaneous rotation speed provided by at least one second specific cylinder out of the entire cylinders of the engine becomes less than a second determination value.

9. The clutch state determining device as in claim 8, wherein the determining means arranges values of the instantaneous rotation speeds of the respective cylinders of the engine sensed by the sensing means in time sequence in accordance with an order of the fuel injections, and the determining means calculates the decreasing rate of the instantaneous rotation speed corresponding to at least one specific cylinder out of the entire cylinders of the engine based on a gradient of a change between the instantaneous rotation speeds of two cylinders, in which the fuel injections are performed successively.

10. The clutch state determining device as in claim 8, further comprising:

variation calculating means for calculating an engine rotation speed variation in a predetermined crank angle range, based on a variation between the instantaneous rotation speeds corresponding to the respective cylinders of the engine sensed by the sensing means, wherein the determining means arranges the values of the engine rotation speed variation calculated by the variation calculating means in time sequence in accordance with an order of the fuel injections, and the determining means calculates the decreasing rate of the instantaneous rotation speed corresponding to at least one specific cylinder out of the entire cylinders of the engine, based on a deviation between the engine rotation speed variations corresponding to two cylinders, in which the fuel injections are performed successively.

11. The clutch state determining device as in claim 10, wherein
the determining means determines that the clutch is in the engaged state if an existence of twisting vibration is shown by the values of the engine rotation speed variation, which are calculated by the variation calculating means and are arranged in time sequence in accordance with the order of the fuel injections.

12. The clutch state determining device as in claim 1, wherein
the determining means determines that the clutch is changing from an engaged state to the disengaged state if the determining means detects a phenomenon in which a decreasing rate of the instantaneous rotation speed provided by at least one specific cylinder out of the entire cylinders of the engine becomes greater than a third determination value.

13. The clutch state determining device as in claim 12, wherein
the determining means arranges values of the instantaneous rotation speeds of the respective cylinders of the engine sensed by the sensing means in time sequence in accordance with an order of the fuel injections, and
the determining means calculates the decreasing rate of the instantaneous rotation speed corresponding to at least one specific cylinder out of the entire cylinders of the engine based on a gradient of a change between the instantaneous rotation speeds of two cylinders, in which the fuel injections are performed successively.

14. The clutch state determining device as in claim 12, further comprising:
variation calculating means for calculating an engine rotation speed variation in a predetermined crank angle range, based on a variation between the instantaneous rotation speeds corresponding to the respective cylinders of the engine sensed by the sensing means, wherein
the determining means arranges the values of the engine rotation speed variation calculated by the variation calculating means in time sequence in accordance with an order of the fuel injections, and
the determining means calculates the decreasing rate of the instantaneous rotation speed corresponding to at least one specific cylinder out of the entire cylinders of the engine, based on a deviation between the engine rotation speed variations corresponding to two cylinders, in which the fuel injections are performed successively.

15. The clutch state determining device as in claim 14, wherein
the determining means determines that the clutch is in the engaged state if an existence of twisting vibration is shown by the values of the engine rotation speed variation, which are calculated by the variation calculating means and are arranged in time sequence in accordance with the order of the fuel injections.

16. The clutch state determining device as in claim 1, wherein
the determining means determines that the clutch is in the disengaged state if the determining means detects a phenomenon in which a decreasing rate of the instantaneous rotation speed provided by at least one specific cylinder out of the entire cylinders of the engine becomes less than a fourth determination value.

17. The clutch state determining device as in claim 16, wherein
the determining means arranges values of the instantaneous rotation speeds of the respective cylinders of the engine sensed by the sensing means in time sequence in accordance with an order of the fuel injections, and
the determining means calculates the decreasing rate of the instantaneous rotation speed corresponding to at least one specific cylinder out of the entire cylinders of the engine based on a gradient of a change between the instantaneous rotation speeds of two cylinders, in which the fuel injections are performed successively.

18. The clutch state determining device as in claim 16, further comprising:
variation calculating means for calculating an engine rotation speed variation in a predetermined crank angle range, based on a variation between the instantaneous rotation speeds corresponding to the respective cylinders of the engine sensed by the sensing means, wherein
the determining means arranges the values of the engine rotation speed variation calculated by the variation calculating means in time sequence in accordance with an order of the fuel injections, and
the determining means calculates the decreasing rate of the instantaneous rotation speed corresponding to at least one specific cylinder out of the entire cylinders of the engine, based on a deviation between the engine rotation speed variations corresponding to two cylinders, in which the fuel injections are performed successively.

19. The clutch state determining device as in claim 18, wherein
the determining means determines that the clutch is in the engaged state if an existence of twisting vibration is shown by the values of the engine rotation speed variation, which are calculated by the variation calculating means and are arranged in time sequence in accordance with the order of the fuel injections.

20. The clutch state determining device as in claim 16, wherein
the rotation speed sensor is a crank angle sensor for outputting multiple rotation signal pulses while a crankshaft of the engine rotates once, and
the sensing means includes speed calculating means for calculating the instantaneous rotation speed provided by each cylinder by measuring time intervals among the rotation signal pulses inputted from the crank angle sensor.

21. The clutch state determining device as in claim 20, wherein
the sensing means takes in the maximum time interval of the rotation signal pulses outputted during a predetermined crank angle period as the lowest instantaneous rotation speed corresponding to a specific cylinder of the engine, and
the sensing means takes in the lowest instantaneous rotation speed as the instantaneous rotation speed corresponding to the specific cylinder.

22. The clutch state determining device as in claim 20, wherein
the sensing means takes in the minimum time interval of the rotation signal pulses outputted during a predetermined crank angle period as the highest instantaneous rotation speed corresponding to a specific cylinder of the engine, and the sensing means takes in the highest instantaneous rotation speed as the instantaneous rotation speed corresponding to the specific cylinder.

23. The clutch state determining device as in claim 20, wherein the sensing means takes in an averaged value of the time intervals of the rotation signal pluses outputted during a predetermined crank angle period as an average instantaneous rotation speed corresponding to a specific cylinder of the engine, and the sensing means takes in the average instantaneous rotation speed as the instantaneous rotation speed corresponding to the specific cylinder.

* * * * *